US011422818B2

(12) United States Patent
Ma

(10) Patent No.: US 11,422,818 B2
(45) Date of Patent: Aug. 23, 2022

(54) ENERGY MANAGEMENT SYSTEM AND METHOD, ELECTRONIC DEVICE, ELECTRONIC APPARATUS, AND NONVOLATILE PROCESSOR

(71) Applicant: INSTITUTE FOR INTERDISCIPLINARY INFORMATION CORE TECHNOLOGY (XI'AN) CO., LTD., Xi'an (CN)

(72) Inventor: Kaisheng Ma, Xi'an (CN)

(73) Assignee: INSTITUTE FOR INTERDISCIPLINARY INFORMATION CORE TECHNOLOGY (XI'AN) CO., LTD., Xi'an (CN)

( * ) Notice: Subject to any disclaimer, the term of this patent is extended or adjusted under 35 U.S.C. 154(b) by 377 days.

(21) Appl. No.: 16/703,583

(22) Filed: Dec. 4, 2019

(65) Prior Publication Data
US 2020/0110614 A1 Apr. 9, 2020

Related U.S. Application Data

(63) Continuation of application No. PCT/CN2019/097149, filed on Jul. 22, 2019.

(30) Foreign Application Priority Data

Aug. 6, 2018 (CN) .......................... 201810884579.0

(51) Int. Cl.
G06F 1/00 (2006.01)
G06F 9/38 (2018.01)
(Continued)

(52) U.S. Cl.
CPC .............. *G06F 9/3844* (2013.01); *G06F 1/26* (2013.01); *G06F 1/3203* (2013.01);
(Continued)

(58) Field of Classification Search
CPC ........ G06F 9/3844; G06F 1/26; G06F 1/3203; G06F 11/008; G06F 11/0721;
(Continued)

(56) References Cited

U.S. PATENT DOCUMENTS 5,625,751 A * 4/1997 Brandwajn ............... H02J 3/24
706/907
10,079,507 B2 * 9/2018 Milenkovic ....... H02J 13/00028
(Continued)

FOREIGN PATENT DOCUMENTS

CN 101132595 A 2/2008
CN 103237338 A 8/2013
(Continued)

OTHER PUBLICATIONS

International Patent Application No. PCT/CN2019/097149, International Search Report dated Oct. 22, 2019 with English Translation, 6 pages.
(Continued)

Primary Examiner — Volvick Derose
(74) Attorney, Agent, or Firm — Leber IP Law

(57) ABSTRACT

The present application provides an energy management system and method, electronic device, electronic apparatus, and nonvolatile processor. The method includes: performing prediction computation based on at least one type of the received power supply information, power storage information, and power outage information of the electronic device for at least one moment, and outputting at least one of a data bitwidth instruction, a start instruction or a write strategy instruction, or/and QoS prediction information; and per-
(Continued)

forming energy management on operations of the processor based on the at least one instruction, or/and the QoS prediction information. In the present application, it can be ensured that the operations of the processor is matched with the expected energy thereof, and the QoS can be matched with the minimum QoS requested in advance.

18 Claims, 12 Drawing Sheets

(51) Int. Cl.
| | | |
|---|---|---|
| G06N 20/00 | (2019.01) | |
| G06F 1/3203 | (2019.01) | |
| G06F 11/00 | (2006.01) | |
| G06F 1/26 | (2006.01) | |
| G06N 3/02 | (2006.01) | |

(52) U.S. Cl.
CPC .............. *G06F 11/008* (2013.01); *G06N 3/02* (2013.01); *G06N 20/00* (2019.01)

(58) Field of Classification Search
CPC .............. G06F 11/0754; G06F 11/3024; G06F 11/3062; G06F 11/3089; G06N 3/02; G06N 20/00; G06N 3/0481; G06N 3/063; G06N 3/084
USPC ........................................................ 713/300
See application file for complete search history.

(56) References Cited

U.S. PATENT DOCUMENTS

| | | | | |
|---|---|---|---|---|
| 10,289,464 | B1* | 5/2019 | DeLozier | G06F 11/0778 |
| 10,606,718 | B1* | 3/2020 | Sandlerman | G06F 11/20 |
| 2006/0182262 | A1* | 8/2006 | Goldman | H04M 19/08 |
| | | | | 379/323 |
| 2010/0109612 | A1* | 5/2010 | Nguyen | G01R 31/40 |
| | | | | 320/136 |
| 2011/0078513 | A1* | 3/2011 | Beattie, Jr. | G06F 1/20 |
| | | | | 714/E11.179 |
| 2013/0046967 | A1* | 2/2013 | Fullerton | H03K 3/037 |
| | | | | 713/100 |
| 2014/0052306 | A1* | 2/2014 | Motobayashi | G05B 15/02 |
| | | | | 307/23 |
| 2016/0300148 | A1* | 10/2016 | Kelly | G06F 11/008 |
| 2017/0003337 | A1* | 1/2017 | Bito | H02P 29/68 |
| 2017/0261949 | A1* | 9/2017 | Hoffmann | G05B 13/0265 |
| 2018/0203072 | A1* | 7/2018 | Park | G01R 31/392 |
| 2019/0278648 | A1* | 9/2019 | Nayak | G06F 11/0793 |
| 2020/0117528 | A1* | 4/2020 | Davelman | G06F 11/079 |
| 2021/0296926 | A1* | 9/2021 | Eleftheriadis | H02J 9/061 |
| 2021/0409962 | A1* | 12/2021 | Kwok | H04W 80/02 |
| 2022/0007213 | A1* | 1/2022 | Mokrushin | H02J 9/06 |
| 2022/0021608 | A1* | 1/2022 | Doshi | H04L 45/22 |
| 2022/0021736 | A1* | 1/2022 | Yang | H04W 8/005 |

FOREIGN PATENT DOCUMENTS

| | | |
|---|---|---|
| CN | 103955355 A | 7/2014 |
| CN | 106055418 | 10/2016 |
| CN | 106055418 A | 10/2016 |
| CN | 106249840 A | 12/2016 |
| CN | 106570585 A | 4/2017 |
| CN | 106627225 A | 5/2017 |
| CN | 106844101 A | 6/2017 |
| CN | 106844103 A | 6/2017 |
| CN | 107678887 A | 2/2018 |
| CN | 109101100 A | 12/2018 |
| CN | 109144214 A | 1/2019 |

OTHER PUBLICATIONS

International Search Report and Written Opinion issued on International Application No. PCT/CN2019/097149, dated Oct. 22, 2019, and English Brief, 13 pages.

\* cited by examiner

ENERGY MANAGEMENT SYSTEM AND METHOD, ELECTRONIC DEVICE, ELECTRONIC APPARATUS, AND NONVOLATILE PROCESSOR

RELATED APPLICATION

This application is a continuation application of International Patent Application No. PCT/CN2019/097149, filed Jul. 22, 2019, which claims priority to Chinese Patent Application No. 2018108845790, filed Aug. 6, 2018, the entire contents of which are hereby incorporated by reference.

TECHNICAL FIELD

The present application relates to the technical field of energy management, in particular to an energy management system, an energy management method, an electronic device, an electronic apparatus, a nonvolatile processor and a computer readable storage medium.

BACKGROUND

The rapid development of IoT device and wireless communication technology brings about the vigorous development of high-performance, small-volume wearable device or implantable device. The demand for high performance means increased energy consumption of system. However, the development speed of battery lags far behind the increase in energy demand, and there are problems in a large volume and a high maintenance cost regarding battery power supply. For this reason, the wearable device or implantable device usually can be self-powered by collecting external energy. However, there are drawbacks in self-powering such as limited energy, drastic changes and unpredictability. Therefore, the IoT node must store and use the limited energy properly and perform reasonable energy management according to the energy demands of different loads, so as to optimize the energy use efficiency.

In the IoT node, in addition to signal processing and control operations inside a processor, there are operations such as data communication and information exchange between the processor and peripheral devices. For example, the operations include reading sensor information from a sensor back to the processor; data written into and read from a memory chip; and data sending and receiving through a radio unit. These result in a very high demand on electric energy for the processor. In a self-powered system, each operation can be completed only if there are sufficient energy. Therefore, it is need for an energy management device of the system to be able to provide such support. Accordingly, it is very important in scientific and rational energy management.

SUMMARY

In view of the aforementioned shortcomings in the prior art, the present application provides an energy management system, an energy management method, an electronic device, an electronic apparatus, a nonvolatile processor and a computer readable storage medium, to achieve energy management in a low-cost manner.

In the first aspect, the present application provides an energy management system applied in an electronic device with a processor, the energy management system comprises a prediction module and an execution module. Wherein, the prediction module is configured to perform a prediction computation based on at least one type of the received power supply information, power storage information and power outage information of the electronic device for at least one moment, and output at least one instruction or/and QoS prediction information, the at least one instruction includes at least one of a data bitwidth instruction, a start instruction or a write strategy instruction; and the execution module is configured to perform energy management on operations of the processor based on the at least one instruction or/and the QoS prediction information output by the prediction module.

In the second aspect, the present application provides an electronic apparatus. The electronic apparatus comprises the energy management system described in the aforementioned first aspect.

In the third aspect, the present application provides a nonvolatile processor. The nonvolatile processor comprises the energy management system described in the aforementioned first aspect.

In the forth aspect, the present application provides an electronic device. The electronic device comprises a processor and the energy management system described in the aforementioned first aspect.

In the fifth aspect, the present application provides an energy management method applied in an electronic device with a processor, the energy management method comprises the following steps: extracting at least one type of information of the electronic device for at least one moment, the at least one type of information includes at least one type of power supply information, power storage information and power outage information; performing a prediction computation based on the at least one type of information and outputting at least one instruction or/and QoS prediction information, the at least one instruction includes at least one of a data bitwidth instruction, a start instruction or a write strategy instruction; performing energy management on operations of the processor based on the at least one instruction or/and the QoS prediction information.

In the sixth aspect, the present application provides a computer readable storage medium. The computer readable storage medium stores a computer program for energy management, and the computer program is used for performing the energy management method described in the aforementioned fifth aspect when being invoked.

As described above, in the energy management system, the energy management method, the electronic device, the electronic apparatus, the nonvolatile processor and the computer readable storage medium of the present application, it can be ensured that the operations of the processor is matched with the expected energy thereof through predicting the future power income or power-off time to obtain the data transmission bitwidth or data write strategy and the timing of starting the operations, and the QoS can be matched with the minimum QoS requested in advance through dynamically adjusting the retention time of nonvolatile element according to the write strategy to match the power condition.

DETAILED DESCRIPTION

Figure 1:
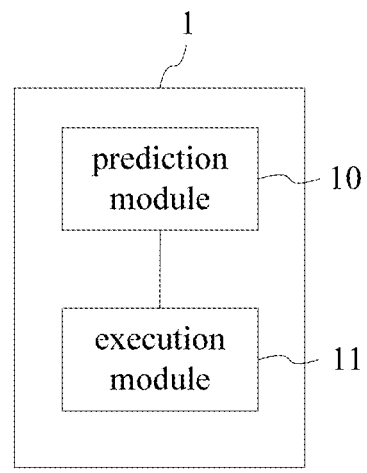
FIG. 1 shows a block diagram of an energy management system of the present application in an embodiment.

Implementations of the present application will be described below through specific embodiments, and those skilled in the art can easily understand other advantages and effects of the present application from the contents disclosed in the present specification. In the following description, please refer to the drawings, which illustrate the embodiments of the present application. It should be understood that other embodiments can also be used, and combination and operational changes can be made without departing from the spirit and scope of the present application. The following detailed description should not be regarded as limitation, and the scope of the embodiments of the present application is defined only by the claims of the present application.

Terms as used herein are only used for describing the specific embodiments, and are not intended to limit the present application.

Although the terms first, second or the like are used herein to describe various elements in some examples, the elements should not be limited by the terms. The terms are only used to distinguish one element from another. For example, a first threshold may be referred to as a second threshold, and similarly, a second threshold may be referred to as a first threshold, without departing from the scope of various described embodiments.

In addition, as used herein, the singular forms "a", "an" and "the" are also intended to contain plural forms, unless indicated to the contrary in the context. For example, in the present application, the expression "at least one moment" includes one moment and a plurality of moments. As used herein, a phrase referring to "at least one" of some items means any combination of the items, including a single item. As an example, "at least one of a, b or c" is intended to contain a, b, c, a-b, a-c, b-c, and a-b-c.

It should be further understood that the terms "include" and "comprise" indicate the existence of the described feature, step, operation, element, component, item, type, and/or group, but do not exclude the existence, presence or addition of one or more other features, steps, operations, elements, components, items, types, and/or groups. The terms "or" and "and/or" as used herein are to be interpreted as inclusive or indicate any one or any combination. It should be understood that the term "and/or" herein merely represents an association relationship describing associated objects, indicating there are three relationships. For example, A and/or B indicates three situations: A exists alone; both A and B exist; and B exists alone. In addition, the character "/" herein generally indicates that the associated objects prior to and following it are in an "or" relationship.

It should be understood that the term "instruction" can also be interpreted broadly in the present application as instruction, data, information, signal, or any combination thereof, and so on. The term "non-volatile" or "non-volatility" denotes the same concept as to nonvolatile.

In IoT device such as wearable device or implantable device, there are many factors such as the cost of replacing battery, battery safety, battery compartment volume, charging time and timeliness that need to be considered. Many devices need the battery in the system as small as possible or even no battery in the system. Accordingly, self-powered system including an ambient energy harvesting power source or data acquisition device has emerged. Especially with the development of nonvolatile processor (NVP), the ambient energy harvesting power supply gets popular in the use of wearable device. NVP can handle unstable input power by backing up the computation state, and as compared with battery power supply, within very short time, a system with such processor is allowed to operate without a battery or super-capacitor.

Although an NVP can, to some extent, ensure continuous execution of the program under unstable power supply, when the power supply of the data acquisition device is unstable, a processor in the existing data acquisition device cannot process the most recently acquired data, cannot ensure data accuracy, and cannot perform recover or back up computation, etc. In some instance, full utilization of energy can increase the number of backup operation, but it also results in wasting more energy in unnecessary backup and restore operations. However, if an energy-saving strategy is used, it may lead to unnecessary leakage of the capacitor. In addition, when being fully charged, the capacitor cannot store newly harvested energy, and also cause delay of the service response time. Thus, it is need to optimize the energy management in the processor, such as predicting the future energy input so as to better allocate resources for one subsequent task, and predicting power outage lasting time to reduce retention time and electric energy used for backup operations.

In view of this, the present application provides an energy management system to improve the energy usage efficiency and the computation efficiency of the processor, and reduce backup energy, while maintaining the most basic quality of service, etc. The energy management system of the present application is applied in an electronic device with a processor. In an embodiment, the processor is, for example, a nonvolatile processor (NVP), but not limited thereto. In other embodiments, without departing from the inventive concept and ideas disclosed herein, the processor is a conventional processor, such as any commercially available processor, controller, microcontroller, or state machine. In some embodiments, the processor is a combination of computing devices, such as a combination of a DSP and a microprocessor, a plurality of microprocessors, one or more microprocessors in coordination with a DSP core, or any other such configuration.

In the embodiments provided by the present application, the electronic device is an IoT device, such as a wearable device or an implantable device. For example, the wearable electronic device includes any type of electronic device that can be worn on a user. The wearable electronic device can be fixed to a human body such as a wrist, ankle, arm or leg. Such electronic device includes, but is not limited to, health or fitness assistant device, digital music player, smart phone, computing device or display, exercise or other activity monitor, device capable of telling time, device capable of measuring biometric parameter of a wearer or user, etc. The implantable device is, for example, a blood glucose detecting device or the like.

As an example, the wearable electronic device is implemented in the form of a wearable health assistant, which provides health related information (real time or non-real time) to the user, an authorized third party, and/or an associated monitoring device. The device is configured to provide health related information or data such as, but not limited to, heart rate data, blood pressure data, temperature data, blood oxygen saturation data, diet/nutrition information, medical reminders, health related prompts or information, or other health related data. The associated monitoring device is, for example, a tablet computing device, a phone, a personal digital assistant, a computer, or the like.

As another example, the electronic device is configured in the form of a wearable communication device. The wearable communication device includes one or more communication interfaces, an output device (such as a display and a speaker), one or more input devices, and a processor coupled to or in communication with a memory. The one or more communication interfaces provides electronic communication between the communication device and any external communication network, device or platform. The interface is such as, but not limited to, a wireless interface, a Bluetooth interface, a USB interface, a Wi-Fi interface, a TCP/IP interface, a network communication interface or any conventional communication interface. In addition to communication, the wearable communication device provides information, message, video, operational commands and so on (and can receive any of the above-mentioned items from an external device) about time, health, status, or an externally connected device or a device that is communicating with the wearable device, and/or software running on such devices.

Referring to FIG. 1, which shows a block diagram of an energy management system of the present application in an embodiment, as shown, the energy management system 1 includes a prediction module 10 and an execution module 11.

The prediction module 10 performs prediction computation based on at least one type (Sensing Results) of received power supply information (Power Sensing), power storage information (Stored Energy Sensing) and power outage information (Power Outage Sensing) of the electronic device for at least one moment, and outputs at least one instruction or/and QoS (Quality of Service) prediction information (Predicted QoS), the at least one instruction includes at least one of a data bitwidth instruction (Bitwidth), a start instruction (System Start) or a write strategy instruction (Write Configuration). The execution module 11 performs energy management on operations of the processor based on the at least one instruction or/and the QoS prediction information output by the prediction module. With the energy management system of the present application, it can be ensured that the operations of the processor is matched with the expected energy thereof through predicting the future power income or power-off time to obtain the data transmission bitwidth or data write strategy and the timing of starting the operations, and the QoS can be matched with the minimum (the most basic) QoS requested in advance through dynamically adjusting the retention time of nonvolatile element according to the write strategy to match the power condition.

In an embodiment, the prediction module 10 receives power supply information, power storage information and power outage information of the electronic device for one or more moments.

In some embodiments, the moments indicate different time periods, and are divided into multiple time levels according to different requirements, such as 10 ms, 100 ms, 1 s, 2 s, 3 s, 10 s, 1 minute, 10 minutes, 1 hour, 1 day, etc. It should be noted that the above moments are exemplary, and are not limited thereto in different implementations.

For example, the prediction module 10 performs prediction operation based on received power supply information of the electronic device for the most recent 10 historical moments, power storage information of the electronic device for the most recent 10 historical moments, and power outage information of the electronic device for the most recent 10 historical moments. Wherein, 10 pieces of power supply information for 10 historical moments belong to a type of power supply information; 10 pieces of power storage information for 10 historical moments belong to a type of power storage information, and 10 pieces of power outage information for 10 historical moments belong to a type of power outage information. In an example, the power supply information of the electronic device for the most recent 10 historical moments are the most recent 10 consecutive power-on moments, or the power storage information of the electronic device for the most recent 10 historical moments are the remaining powers for the most recent 10 moments, or the power outage information of the electric device for the most recent 10 historical moments are the power outage durations for the most recent 10 moments.

In an embodiment, the prediction module 10 obtains, by means of a feature extraction module, power supply information of the electronic device for at least one moment when detecting that the electronic device is powered on or during a power-on period of the electronic device.

In another embodiment, the prediction module 10 obtains, by means of a feature extraction module, power storage information of the electronic device for at least one moment when detecting that the electronic device is powered on or during a power-on period of the electronic device.

In still another embodiment, the prediction module 10 obtains, by means of a feature extraction module, power outage information of the electronic device for at least one moment when detecting that the electronic device is powered off or during a power-on period of the electronic device.

In some embodiments, the power supply information is power-on information of the electronic device, and the power supply information is generated by a self-powered system such as an energy harvester of the electronic device, which obtains energy from human motion, for example, obtains vibration energy generated by human actions or behaviors such as walking or swinging of limb, jumping, pressing (such as pressure obtained by a small energy harvester implanted in a shoe during running), and breathing, and converts the vibration energy into electric energy. In other embodiments, the energy is from the natural environment, such as solar energy. The electric energy harvested by the energy harvester is processed from AC to DC or DC to DC, and then the harvested energy is temporarily stored in an off-chip or even on-chip capacitor which is mainly used for supporting data rather than storing energy.

In some embodiments, the power storage information is information on the electric quantity stored in a battery or power storing capacitor of the electronic device, such as information on the stored power acquired in real time or intermittently if the power consumption is assumed to be constant.

In some embodiments, the power outage information is information about power income interruption in the electronic device caused by insufficient energy supply, or energy exhaustion, or human factors (such as artificial settings or damages) or unforeseeable accidents, for example, the information is the power-off time, power outage duration and so on. In an embodiment, ten levels of power-off time are set, such as 10 ms, 100 ms, 1 s, 2 s, 3 s, 10 s, 1 minute, 10 minutes, 1 hour, 1 day, or other different time periods.

In an embodiment, the prediction module 10 performs prediction computation, by one or more neural networks, on at least one type of the received power supply information, power storage information and power outage information of the electronic device for at least one moment, and outputs at least one of the data bitwidth instruction, the start instruction or the write strategy instruction, or/and the QoS prediction information. In an example, the neural network is a feedforward neural network, which is an offline trained neural network or an online back-propagation trained neural network.

Figure 2:
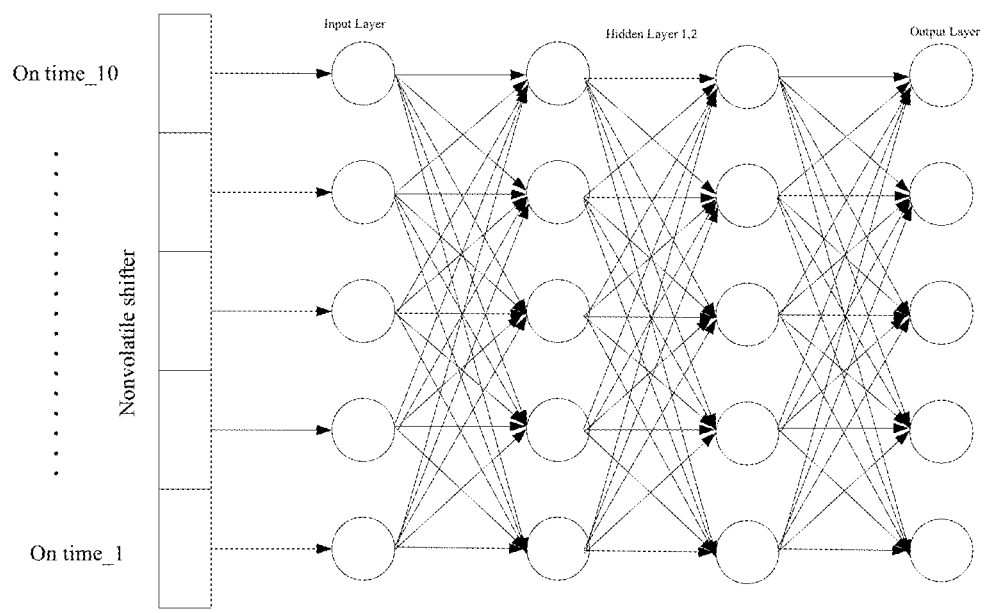
FIG. 2 shows a schematic diagram of a neural network for a prediction module in an energy management system of the present application in an embodiment.
Figure 3:
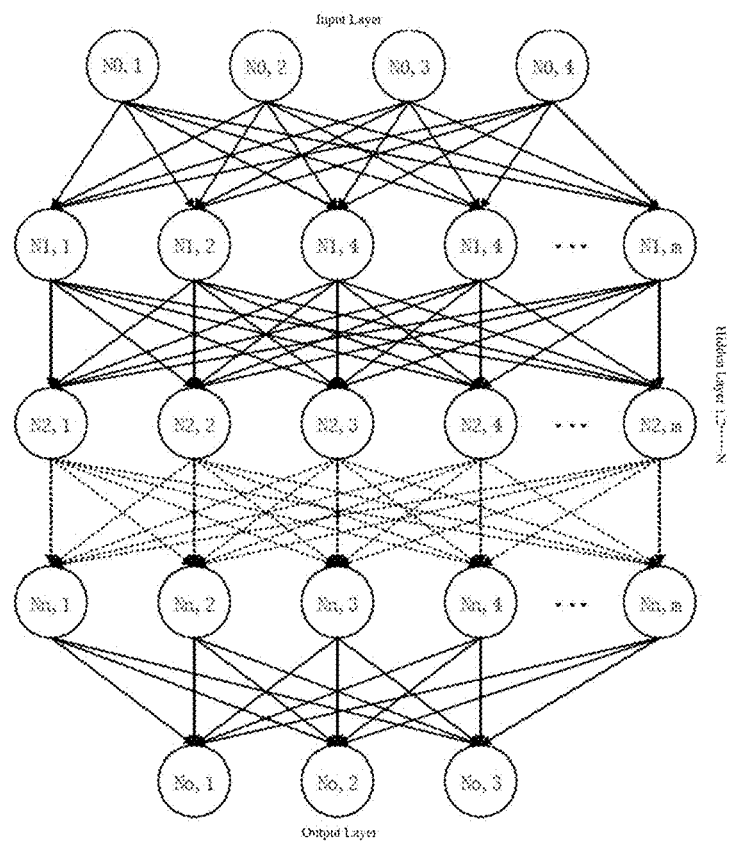
FIG. 3 shows a schematic diagram of another neural network for a prediction module in an energy management system of the present application in an embodiment.

Referring to a neural network in FIG. 2, which shows a schematic diagram of a neural network for a prediction module in an energy management system of the present application in an embodiment, as shown, in the embodiment, for example, the neural network is a feedforward neural network, which includes one input layer, two hidden layers (Hidden Layer 1, 2), and one output layer, wherein each layer has 10 neurons, and each neuron has 10 outputs. The feedforward neural network predicts the electric energy generated in the future or possible interrupted time in the future based on power supply information, power storage information or power outage information for 10 moments (from On time_1 to On time_10) received from a nonvolatile shifter (NV Shifter). However, it is not limited thereto. In other embodiments, as in another neural network structure in FIG. 3, which shows a schematic diagram of another neural network for a prediction module in an energy management system of the present application in an embodiment, as shown, the feedforward neural network includes more hidden layers (Hidden Layer 1, 2 . . . N), and each layer also includes more or fewer neurons (N). The neural network shown in FIG. 3 is an offline trained neural network or an online back-propagation trained neural network.

Figure 4:
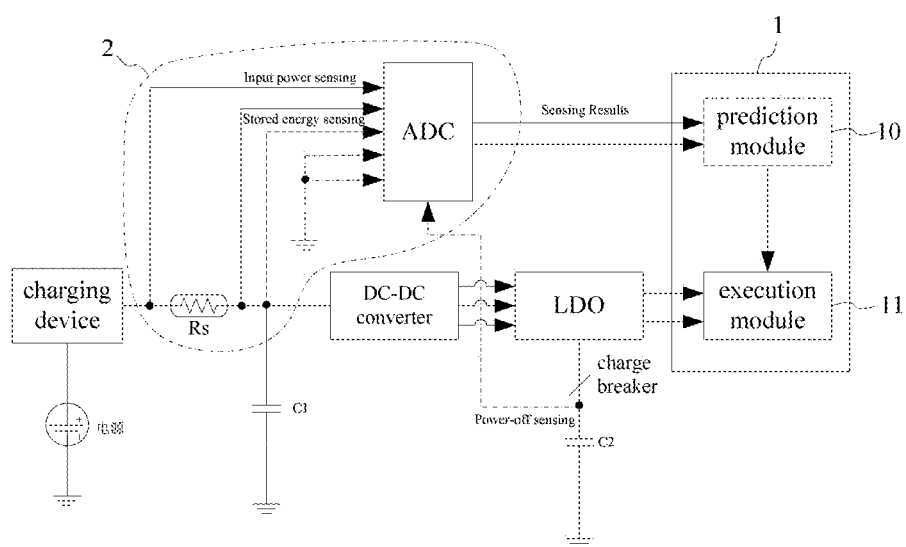
FIG. 4 shows a circuit block diagram of a feature extraction module in an energy management system of the present application in an embodiment.

In an embodiment, the prediction module 10 acquires, by means of a feature extraction module, power supply information, power storage information or power outage information for one or more moments, and the feature extraction module transmits the information that is served as detection results (Sensing Results) to the prediction module 10. Referring to FIG. 4, which shows a circuit block diagram of a feature extraction module in an energy management system of the present application in an embodiment, as shown, the feature extraction module 2 includes: a detection unit, an energy storage unit, and a power outage sensing unit, and the feature extraction module is in communication connection with the energy management system.

In the embodiment, a feature extraction module of the front-end circuitry includes a power source which is a battery for example or which includes a charging device, wherein one end of the power source is grounded, and the other end thereof is connected to an Rs resistor, the Rs resistor is used as a detecting element. The feature extraction module acquires the power supply information supplied to the electronic device to the prediction module 10 by collecting a value of current flowing through the detecting element Rs or a voltage value across it. The Rs resistor and a 6-bit ADC converter in FIG. 4 constitute the detection unit in the embodiment, used for detecting and obtaining the power supply information (Input Power Sensing), as indicated by a solid arrow in the figure. In some embodiments, the power supply information is power-on information of the electronic device, and the power supply information is generated by the self-powered system of the electronic device.

In the embodiment, the energy storage unit is configured to acquire the power storage information (Stored energy sensing) i.e. the remaining power of the energy storage element by collecting a voltage difference (voltage drop) across an energy storage element, as indicated by a broken arrow in the figure; the energy storage element is a grounding capacitor C1 in FIG. 4. The capacitor C1 and the ADC converter in FIG. 4 constitute the energy storage unit in the embodiment.

In the embodiment, the power outage sensing unit is configured to acquire the power outage information (Power-off sensing) including power-off time by collecting a voltage difference across a leak element, as indicated by a dotted arrow in the figure. The leak element is a leak capacitor C2 in FIG. 4, wherein one end of the leak capacitor C2 is connected to an LDO device via a DC-DC converter and a charge breaker, and the other end of the leak capacitor C2 is grounded. In a particular implementation, the leak capacitor C2 is charged every time during a restore operation controlled by the charge breaker. The DC-DC converter, the LDO device, the charge breaker, the leak capacitor C2, and the ADC converter in FIG. 4 constitute the power outage sensing unit. As shown in FIG. 4, by charging the leak capacitor every time during a restore operation controlled by the LDO, and by checking the voltage of the capacitor when the electronic device is recovered from a power outage, the power-off time of the system is calculated through a voltage drop sensed by the ADC.

In an embodiment, the prediction module 10 includes one or more nonvolatile shift units, the nonvolatile shift unit is for example a nonvolatile shifter (NV Shifter), and the power supply information, power storage information and the power outage information of the electronic device for one or more moments received by the prediction module 10 are stored in the nonvolatile shift units respectively.

Figure 5:
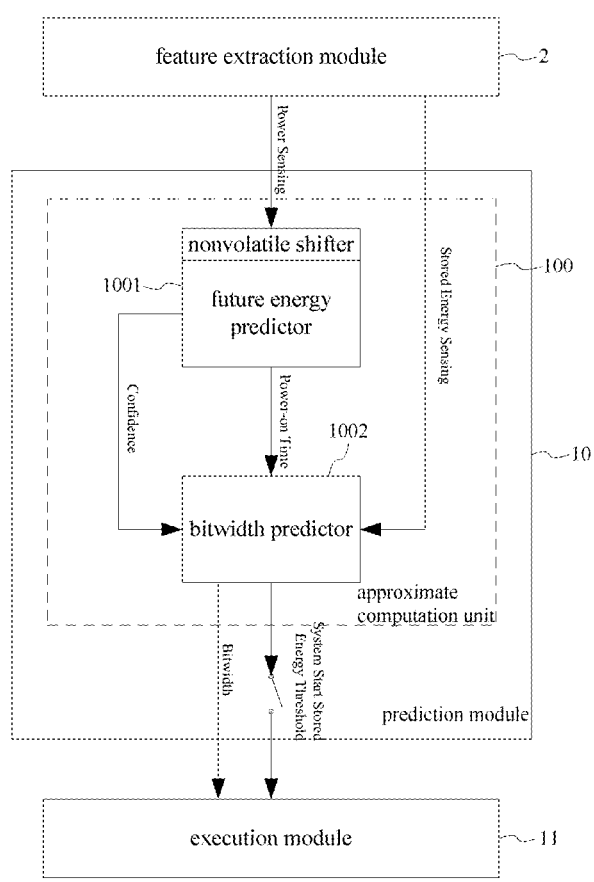
FIG. 5 shows a schematic diagram of a prediction module in an energy management system of the present application in an embodiment.

The prediction module 10 described in the application performs the prediction operation by approximate computation to dynamically match an energy dissipation profile with an input energy profile. Referring to FIG. 5, which shows a schematic diagram of a prediction module in an energy management system of the present application in an implementation, as shown, in an embodiment, the prediction module 10 includes an approximate computation unit 100, and the approximate computation unit 100 is configured to perform approximate computation for prediction according to the power supply information and the power storage information, and output the data bitwidth instruction and the start instruction. In the embodiment, the approximate computation unit 100 includes a future energy predictor 1001 and a bitwidth predictor 1002.

The future energy predictor 1001 predicts future power-on time and a power-on confidence of the electronic device based on the power supply information (Power Sensing). In the embodiment, the future energy predictor 1001 has one or more nonvolatile shift units, the nonvolatile shift unit is for example a nonvolatile shifter (NV Shifter). The future energy predictor 1001 stores the received power supply information of the electronic device for one or more moments in the nonvolatile shift units. In the embodiment, the future energy predictor 1001 stores the received power supply information of the electronic device for 10 moments in the nonvolatile shift units.

In the embodiment, taking an example that the future energy predictor 1001 performs prediction computation, by a feedforward neural network, on the received most recent 10 consecutive power-on moments of the electronic device, a counter (not shown) is used to calculate the power-on time, and the counter pushes the last calculated power-on time to the nonvolatile shifter to replace the earliest power-on time.

In the embodiment, a fully connected feedforward neural network with 2 hidden layers is set, and each layer is set with 10 neurons, wherein 10 neurons of the output layer output 10 potential energy levels (energy grades), and each energy level is converted and corresponding to a power-on time, and each output indicates a power-on confidence, when the power-on confidence is very distinct from the others, the highest of which is output as the predicted energy level and its confidence. In a situation, if the top several predicted power-on confidences are within a range of 10%, the predicted energy levels corresponding to future power-on times are weighted averaged, and the corresponding power-on confidences are also averaged.

The bitwidth predictor 1002 is configured to perform approximate computation for prediction according to the future power-on time, the power-on confidence and the received power storage information (Stored Energy Sensing) of the electronic device, and output a data bitwidth instruction (Bitwidth) and a start threshold (System Start Stored Energy Threshold). The bitwidth predictor 1002 dynamically collects the bitwidth required in dynamically predicting the execution module 11 during each boot interval, thereby reducing computing and backup costs of the processor and shortening response time.

In the embodiment, the bitwidth predictor 1002 performs prediction by a feedforward neural network to output a data bitwidth instruction and a start threshold. The feedforward neural network for the bitwidth predictor 1002 receives the energy level corresponding to future power-on time, power-on confidence and the stored energy level contained in the power storage information as inputs, wherein the feedforward neural network includes a input layer, 2 hidden layers, and 1 output layer, each layer has 10 neurons, and each neuron has 10 outputs. The output layer outputs two kinds of information: one for bitwidth, consisting of 8 outputs, each of which stands for configuration of bitwidth 1 to 8 (highest will be selected as bitwidth configuration), and another for NVP start threshold, meaning "should the NVP start now or waiting until there are enough stored energy higher than predicted threshold".

In the embodiment, when the input layer of the feedforward neural network for the bitwidth predictor 1002 receives the 10 potential energy levels (energy grades) and the power-on confidence corresponding to each energy level output by the future energy predictor 1001, the start threshold is output after prediction computation by the two hidden layers to give the execution module 11 an instruction of whether to start.

For example, if the predicted potential energy level is relatively low and the stored energy in the buffer capacitor is insufficient, the execution module 11 will not be started; if the predicted potential input energy is high, but the received power-on confidence is relatively low, the execution module 11 is instructed to be started only when the stored energy level is high enough to reach the predicted threshold; and if the predicted potential input energy is high and the power-on confidence is relatively high, the execution module 11 is still instructed to be started (the predictor outputs a very low threshold) even if the stored energy is relatively low, to achieve a better forward progress and QoS satisfaction. In an example, the power-on confidence being relatively low is, for example, smaller than 30%, and the power-on confidence being relatively high is, for example, greater than 70%. However, it is not limited thereto. In the case of knowing the innovative idea of the present application, the threshold of the power-on confidence can be dynamically adjusted according to the actual situation.

In the embodiment, the feedforward neural network for the bitwidth predictor 1002 is also used to determine an output data bitwidth through prediction, that is, performing approximate computation for prediction according to the 10 potential energy levels (energy grades) and the power-on confidence corresponding to each energy level output by the future energy predictor 1001 which are received by the input layer of the feedforward neural network for the bitwidth predictor 1002, and determine a proper output data bitwidth so as to determine at which energy level and with which precision the execution module 11 performs operations.

In the embodiment, the process of performing approximate computation, by the feedforward neural network configured as the bitwidth predictor 1002, according to the future power-on time, the power-on confidence, and the power storage information of the electronic device to obtain a data bitwidth instruction is as follows:

First, prediction computation is performed according to the future power-on time, the power-on confidence, and the power storage information of the electronic device to obtain approximate configuration data (Approx Config); in the embodiment, when the 10 potential energy levels (energy grades) and the power-on confidence corresponding to each energy level are received by the neural network for the bitwidth predictor, the approximate configuration data is computed through prediction performed by the two hidden layers, wherein the approximate configuration data includes bitwidth information obtained by the bitwidth predictor through performing prediction computation by the neural network according to the future power-on time, the power-on confidence, and the power storage information, such as how many bits (bitwidth) the processor uses to perform the computation to determine the correct or proper bitwidth configuration.

And then, the approximate configuration data (Approx Config) is identified according to preset approximate identification data (ACEN), and when it is determined that the approximate configuration data can be approximated, an approximate computation is performed to generate a data bitwidth instruction (Bitwidth). In the embodiment, the approximate identification data (ACEN) is preset, specifically, the approximate identification data is data identified by a programmer that can be approximated. Such data include data buffer or image excluding essential variables like the index in a "for" loop.

Figure 17:
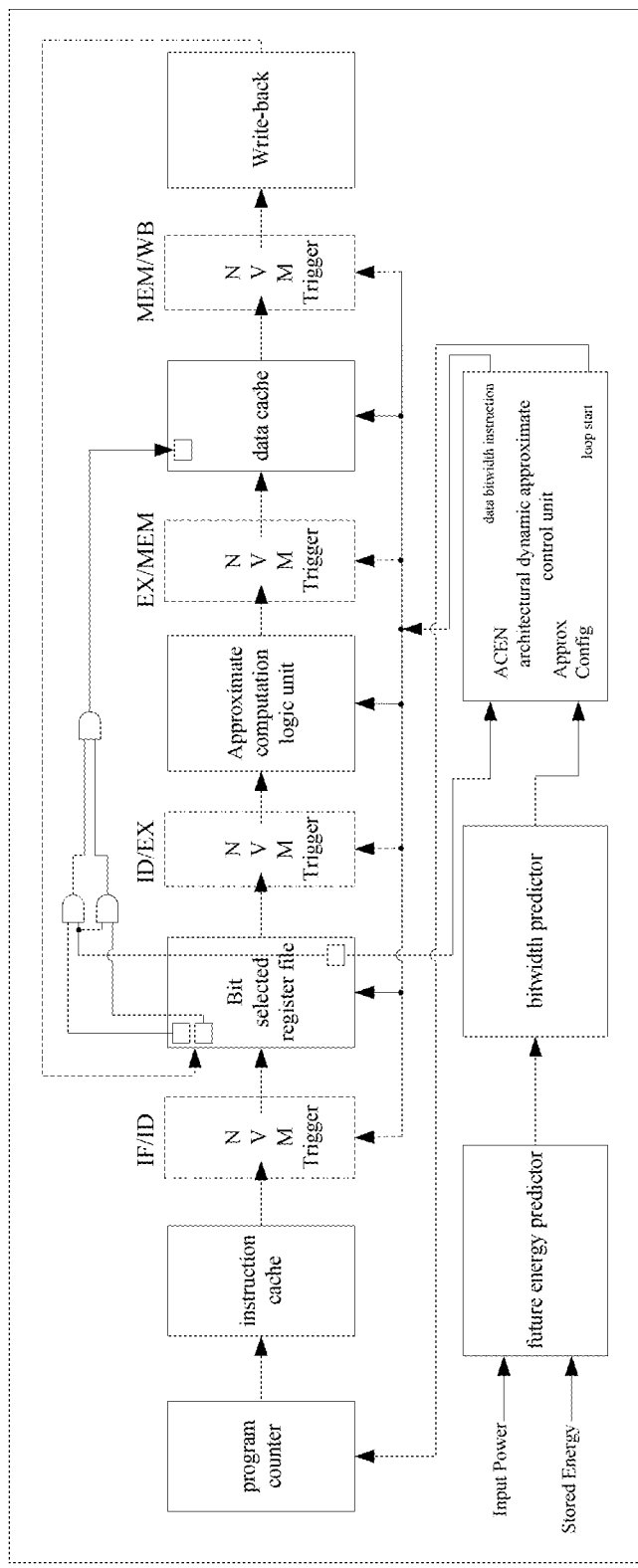
FIG. 17 shows a schematic diagram of an approximate computing architecture of the present application in an embodiment.

Referring to FIG. 17, which shows a schematic diagram of an approximate computing architecture in a process of obtaining a data bitwidth instruction of the present application in an embodiment, as shown, the approximate computing architecture includes a 5-stage pipelined processor architecture, and an architectural dynamic approximate control unit performs approximate computation control on the pipelined processor architecture. As shown, a neural network configured as the future energy predictor performs prediction according to the power supply information (Input Power) to compute the future power-on time and the power-on confidence of the electronic device, and a neural network configured as the bitwidth predictor performs prediction computation according to the future power-on time, the power-on confidence, and the power storage information (Stored Energy) of the electronic device to obtain approximate configuration data (Approx Config), and then an approximate control unit preset with an approximate identification data (ACEN) interface adds one bit called ACEN to each approximate configuration datum to identify whether the approximate configuration datum can be approximated during operation. The architectural dynamic approximate control unit reads the approximate identification data (ACEN) and the obtained approximate configuration data (Approx Config) from two operators in one instruction. If it is determined that one operator is approximatable, and the other one is not, the instruction is not approximated. If both operators are approximatable, then a data bitwidth instruction (Bitwidth) is generated so that the processor performs approximate computation by using the 5-stage pipelined processor architecture to control the computation (operation) precision of the processor. As can be seen from the above description, a neural network configured as the bitwidth predictor is only activated once in the beginning of the programer pre-defined loop in the main program, which is commonly a loop for new frames to be processed. A neural network configured as the bitwidth predictor is used to determine a proper bitwidth to finish a loop operation of the whole program within this power-on period.

In an embodiment, for example, the architectural dynamic approximate control unit is an approximate bitwidth controller disposed in the processor or execution module, and the approximate bitwidth controller is configured to control the operation precision according to the data bitwidth instruction when receiving the data bitwidth instruction (Bitwidth) output by a neural network configured as a bitwidth predictor. In the embodiment, the approximate bitwidth controller has one or more nonvolatile shift units, the nonvolatile shift unit is for example a nonvolatile shifter (NV Shifter), and the approximate bitwidth controller stores the received data bitwidth instruction in the nonvolatile shift unit.

The computation of the processor includes that the processor calculates and processes the sensed data or interaction data acquired by the electronic device. In some examples, the process of the sensed data includes that, for example, a wearable device performs processing operation to generate user data that is transmitted by a wireless module or displayed by a display device based on the collected heart rate data, blood pressure data, temperature data, blood oxygen saturation data, diet/nutrition information, medical reminders, health related prompts or information, or other health related data.

In some examples, the process of the interaction data includes that, for example, a user operates a wearable device to respond to an event notification generated by a host device. The wearable device receives an event notification from a host device, and present a reminder and a prompt for response to the user. If the user responds to the prompt, the wearable device transmits the response to the host device. For example, the user responds to a telephone call, text message or other communication received at the host device.

Figure 6:
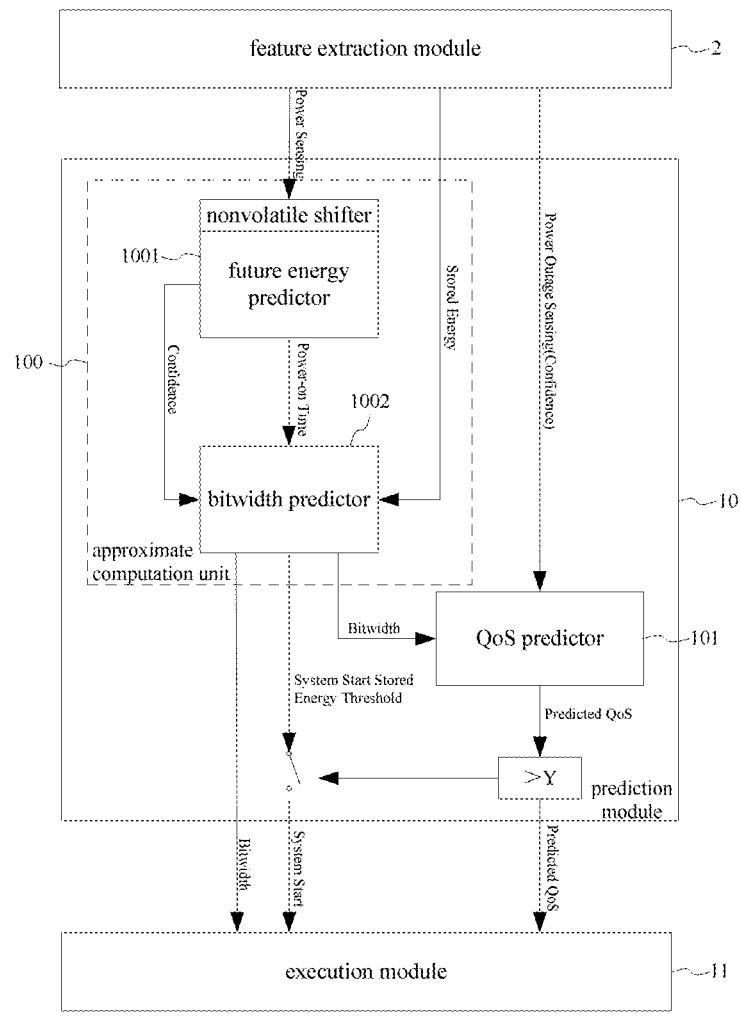
FIG. 6 shows a schematic diagram of a prediction module in an energy management system of the present application in another embodiment.

In an embodiment, to avoid low-quality data output by the electronic device, wherein the low quality data is for example data below 20 dB, correspondingly data of 20 dB and above is generally considered to be reasonable-quality data, the prediction module 10 in the present application also includes a QoS predictor, the QoS predictor predicts the potential output quality of the program of the electronic device based on the output of the bitwidth predictor 1002 and power outage predictor. Referring to FIG. 6, which shows a schematic diagram of a prediction module in an energy management system of the present application in another embodiment, as shown, the prediction module 10 includes a QoS predictor 101, and the QoS predictor 101 is configured to perform prediction computation according to the data bitwidth instruction and the power outage information to obtain QoS prediction information (Predicted QoS), and output the QoS prediction information to the execution module 11 when the QoS prediction information satisfies a first threshold, and output a start instruction to the execution module 11 when the start threshold satisfies the first threshold; the power outage information includes a power outage confidence; and in an example, the power outage confidence is obtained through prediction by a power outage predictor.

The QoS predictor 101 acquires an approximate bitwidth and an averaged power outage prediction confidence during the time that a frame is processed as input. In an embodiment, the QoS predictor 101 performs prediction computation according to the data bitwidth instruction (Bitwidth) and power outage information (Power Outage Sensing) to obtain QoS prediction information (Predicted QoS); and the QoS prediction information (Predicted QoS) is output to the execution module 11 when the QoS prediction information satisfies a first threshold Y, and a start instruction (System Start) is output to the execution module 11 when the start threshold (System Start Stored Energy Threshold) satisfies the first threshold Y. The power outage information includes a power outage confidence (Confidence), and the power outage confidence is generated by a power outage predictor. In the embodiment, the first threshold Y is, for example, 20 dB, but is not limited thereto. In different implementation states, for example, for different types of electronic device, different thresholds Y can be set. In an embodiment, the QoS predictor 101 performs prediction of quality of service by a neural network including two hidden layers.

Since the high bitwidth operation (the computation precision of processor is high) dissipates more power than the low bitwidth operation (the computation precision of processor is low), the execution module 11 is controlled to start a stored energy threshold in the present application, that is, the start moment of the execution module 11 is controlled by the QoS predictor 101 shown in FIG. 5, so that the problem of low quality output can be alleviated in the case the energy management is reasonable, and the start moment of the execution module 11 is delayed by controlling the parameter of the first threshold Y until there are sufficient energy in the energy storage capacitor and then starting the execution module 11, so that high quality data operation or output can be ensured under a reasonable energy management mechanism.

Figure 7:
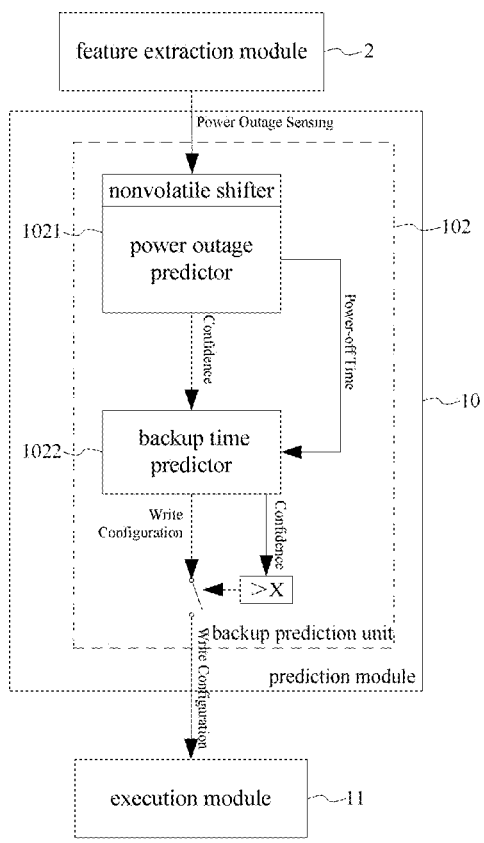
FIG. 7 shows a schematic diagram of the prediction module in the energy management system of the present application in yet another embodiment.

Although many electronic devices can be powered by unstable power sources (such as energy harvesters in self-powered systems) with the help of nonvolatile components, the backup operation of the electronic devices during working still consumes a lot of electric energy, especially when the power supply is intermittent high. Therefore, if the power outage information can be obtained in advance through a certain technology, and the retention time of an NVM (Non-volatile memory, abbreviated as NVM) is shortened from a long time (such as 10 years or more) to only slightly longer than the power-off time, necessary energy can be saved during the data backup operation. Accordingly, the prediction module 10 in the energy management system of the present application includes a backup prediction unit 102. Referring to FIG. 7, which shows a schematic diagram of a prediction module in an energy management system of the present application in yet another embodiment, as shown, the backup prediction unit 102 includes a power outage predictor 1021 and a backup time predictor 1022.

The power outage predictor 1021 is configured to predict future power-off time and a power outage confidence according to the power outage information output by the feature extraction module. In the embodiment, the power outage predictor 1021 is configured to predict future power-off time and a power outage confidence according to the power outage information (Power Outage Sensing) at a plurality of moments output by the extraction module. In an example, the power outage information is information about power income interruption in the electronic device caused by many factors such as insufficient energy supply, or energy exhaustion, or human settings or unforeseeable accidents, for example, the information is the power-off time node, power outage duration and so on. In an embodiment, ten levels of power-off time are set, such as 10 ms, 100 ms, 1 s, 2 s, 3 s, 10 s, 1 minute, 10 minutes, 1 hour, 1 day, or other different time periods.

In an example, the power outage information is collected by a power-off sensing unit of the feature extraction module. For example, the DC-DC converter, the LDO device, the charge breaker, the leak capacitor C2 and the ADC converter in FIG. 4 constitute the power outage sensing unit. By charging the leak capacitor every time during a restore operation controlled by the charge breaker, as shown in FIG. 4, and by checking the voltage of the capacitor when the electronic device is recovered from a power outage, the power-off time of the system is calculated through a voltage drop sensed by the ADC. In detail, as shown in the section of the power outage sensing unit in FIG. 4. When the system is powered on each time (before a restore operation), the leak capacitor is charged in full stable voltage. When power failure happens, the voltage on the leak capacitor drops over time. The power-off time of detection is obtained by measuring the remaining voltage on the leak capacitor after next powered-on.

In the embodiment, the power outage predictor 1021 has one nonvolatile shift unit, such as a nonvolatile shifter (NV Shifter), and the power outage predictor 1021 stores the received power outage information (Power Outage Sensing) of the electronic device at one or more moments in the nonvolatile shift unit. In an example, taking an example of the most recent 10 consecutive power-off information of the electronic device received by the power outage predictor 1021, a counter (not shown) is used to calculate power-off time, and the counter pushes the last calculated power-off time to the nonvolatile shifter to replace the earliest power-off time.

In the embodiment, the power outage predictor 1021 is provided with a fully connected feedforward neural network having 1 input layer, 2 hidden layers, and 1 output layer, and each layer has 10 neurons, the input layer is configured to receive power outage information such as 10 historical power-off time from the nonvolatile shift unit, and the 2 hidden layers of the feedforward neural network is used to compute the power outage information, the output layer outputs predicted results such as future power-off times corresponding to 10 power outage time levels and power outage confidence corresponding to each future power-off time.

As an electronic device is usually provided with a block/distributed nonvolatile memory (NVM), the system often consumes a great deal of backup energy during data backup operations. To avoid this unnecessary consumption, backup retention time can be improved to reduce backup energy, thereby achieving energy saving control. To this end, in the present application, a reasonable write strategy is determined by predicting the power-off time, in other words, the data backup time is determined based on the write current is used at what time and in what magnitude.

The backup time predictor 1022 is configured to generate a write strategy instruction (Write Configuration) and a write strategy confidence (Confidence) according to the future power-off time (Power-off Time) and the power outage confidence (Confidence), and output the write strategy instruction to the execution module 11 when the write strategy confidence satisfies a second threshold; the write strategy instruction includes at least one of a write current and write time for performing a write operation. The write time is the duration of data write. In a specific implementation, the duration of data write is determined by the write pulse width. The write current and the write pulse width can affect the retention (holding or backup) time of the written data. In the embodiment, the write strategy instruction is a retention time configuration containing written data or is a retention time strategy, and the backup retention time can be improved by the control of the write strategy to reduce the backup energy, thereby achieving the energy saving purpose.

In an embodiment, the backup time predictor 1022, by a neural network, receives the future power-off time and the power outage confidence and performs prediction computation to obtain the write strategy instruction and the write strategy confidence. Specifically, the neural network is, for example, a feedforward neural network, which is an offline trained neural network or an online back-propagation trained neural network. The feedforward neural network is of the network structure as shown in FIG. 3 or 4. For example, the neural network is configured as the time backup predictor for prediction computation to obtain a write strategy instruction (Write Configuration) and a write strategy confidence (Confidence).

In an embodiment, the backup time predictor 1022 is also configured to perform prediction computation according to the future power-off time and the power outage confidence, and obtain the write strategy instruction by weighing the write current and the write time in the write strategy instruction. In the embodiment, the purpose of weighing the write current and write time in the write strategy instruction is to find an optimal write strategy, that is, performing a data write operation with a minimum write current and shortest write time.

Figure 8:
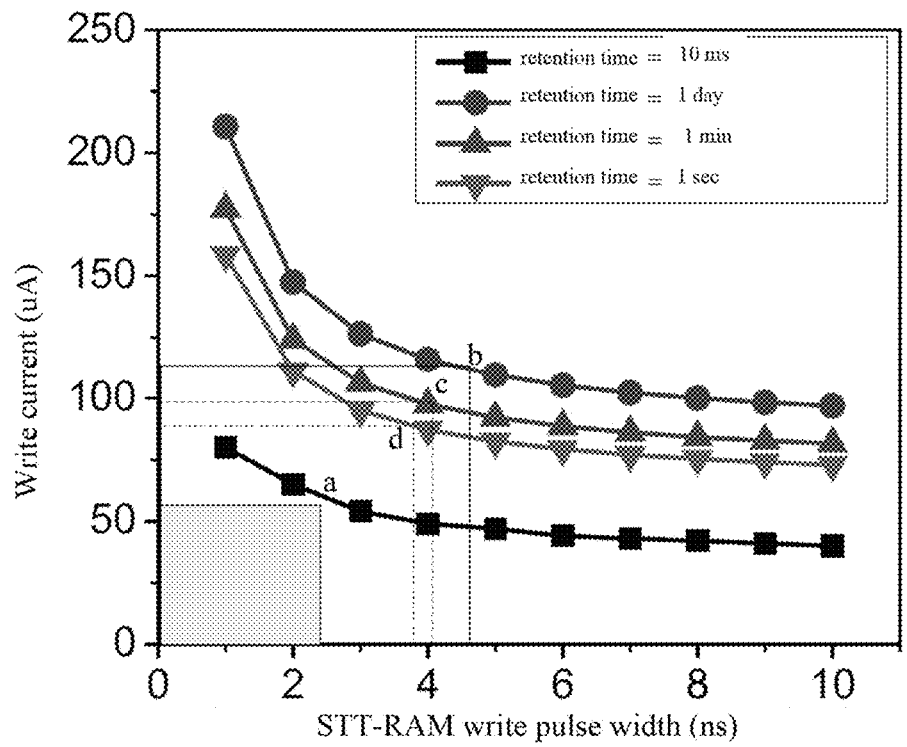
FIG. 8 shows a schematic diagram of the relationship between a write current and a write pulse width in a write strategy of the present application in an embodiment.

Referring to FIG. 8, which shows a schematic diagram of the relationship between a write current and a write pulse width in a write strategy of the present application in an embodiment, as shown in FIG. 8, when the write strategy determines that the retention time of the written data is 10 ms, the write current and the write pulse width in the profile composed of square dots in FIG. 8 are adopted, in the profile, to weigh the write current and the write time, the write current and the write pulse width corresponding to the coordinates of the vertex at the upper right corner of a small square illustrated in FIG. 8 (i.e. point "a" indicated by an arrow in FIG. 8) are used; correspondingly, when the write strategy determines that the retention time of the written data is 1 day, the write current and the write pulse width in the profile composed of round dots in FIG. 8 are adopted, in the profile, to weigh the write current and the write time, the write current and the write pulse width corresponding to the coordinates of the vertex at the upper right corner of a large square illustrated in FIG. 8 (i.e. point "b" indicated by an arrow in FIG. 8) are used; likewise, when the write strategy determines that the retention time of the written data is 1 minute or 1 second, the write current and the write pulse width in the profile composed of triangular dots or inverted triangular dots in FIG. 8 are adopted, in the profiles, to weigh the write current and the write time, the write current and the write pulse width corresponding to the coordinates of the vertex at the upper right corner of a square illustrated in FIG. 8 (i.e. point "c" or "d" indicated by an arrow in FIG. 8) are used.

Figure 18:
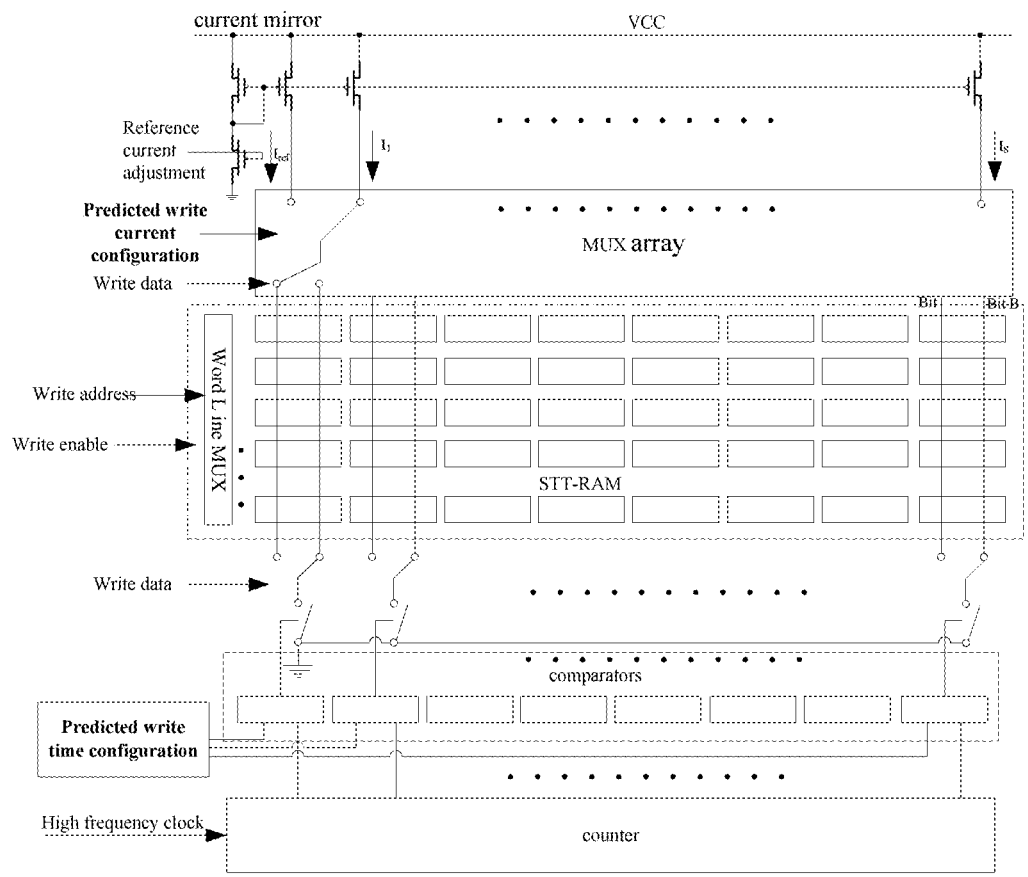
FIG. 18 shows a schematic diagram of a write operation circuit of the present application in an embodiment.

Since the write current and write pulse width for data can affect the retention (holding or backup) time of the written data, the present application provides a write current. Referring to FIG. 18, which shows a schematic diagram of a write operation circuit of the present application in an embodiment, as shown, according to the write current and the write time determined from the write strategy instruction, current mirror generates different currents, and counter determines different time, and write data MUX array shown in FIG. 18 controls the selection of current, so as to determine the magnitude of the current used for writing data, such as eight path circuits denoted by $I_1$ to $I_8$, different durations are selected by a write time comparator shown to determine how much time is used to write data.

In FIG. 18, $I_{ref}$ is a reference current of the current mirror, different write currents from $I_1$ to $I_8$ are generated by changing the W/L ratio (the width-to-length ratio of the transistor channel, which can determine the amplification factor of the current mirror) of the current mirror composed of PMOS transistors. In this embodiment, the maximum current variation rate is from 1 day to 10 ms. According to the predicted write current configuration in the figure, different currents are selected in the MUX array, and the write current is connected to either "Bit" or "Bit B" (write data can be changed by flipping the current direction of "Bit" or "Bit B"), specifically depending on the input of the "write data" signal. The other line of "Bit" or "Bit B" controls the write time. Using a high frequent 4-bit counter (sub ns per cycle), the counted time of the counter is compared with the predicted write time configuration as shown in the figure. Once the counter time reaches preset write time, the write operation is terminated by disconnecting the connection to GND. In the embodiment, data is written into the memory by performing the write operation, and the memory is an NVM (Non-volatile memory, abbreviated as NVM), such as STT-RAM (Shared Transistor Technology Random Access Memory).

Referring to FIG. 7, the backup time predictor 1022 outputs the write strategy instruction to the execution module 11 when the write strategy confidence satisfies a second threshold X, wherein the second threshold X is a preset power outage confidence. When the power outage confidence obtained by the backup time predictor 1022 through prediction by the neural network is greater than the preset power outage confidence X, the backup time predictor 1022 transmits the write strategy instruction to the execution module 11. In different implementation states, the second threshold X can be set to different values, and the different implementation state includes a medium of a storage device for write data, such as an STT-RAM (Shared Transistor Technology Random Access Memory) or the like; in addition, the different implementation state also includes different data content that the processor requires to record, and so on.

In an embodiment, when the power outage predictor 1021 predicts that the power-off time is relatively short, for example the power-off time is less than 50 ms or the power outage confidence is less than 80%, the system uses the stored energy to operate and no backup operation is required, that is, the backup time predictor 1022 does not transmit the write strategy instruction to the execution module 11.

In another embodiment, when the memory in the electronic device is, for example, a low standby power consumption static random access memory (SRAM), as the standby power consumption of such memory is relatively low, for example, when the power-off time is between 50 ms and 0.2 s, backup is not needed, that is, the backup time predictor 1022 does not transmit the write strategy instruction to the execution module 11.

In an embodiment, the execution module 11 is a part of the processor in the electronic device, and the processor is a nonvolatile processor (NVP) for calculating and processing the sensed data acquired by the electronic device.

Figure 9:
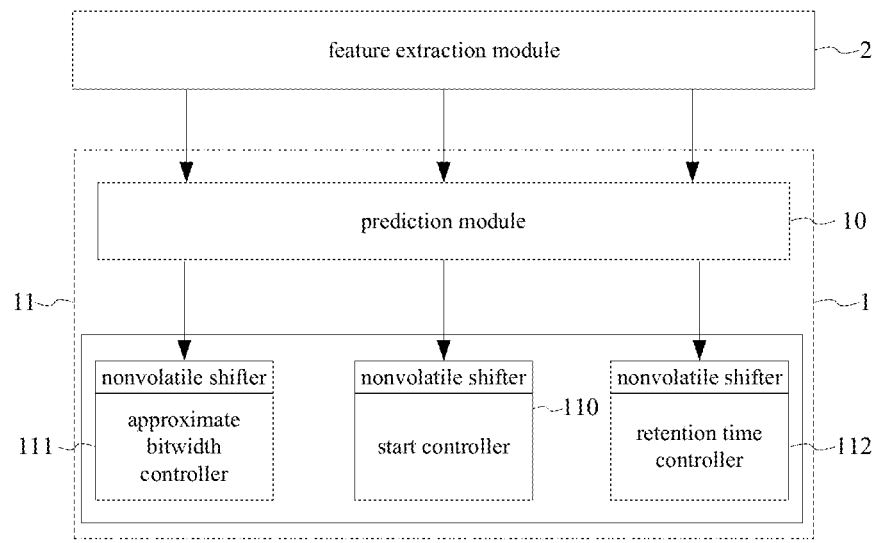
FIG. 9 shows a schematic diagram of an execution module in an energy management system of the present application in an embodiment.

Referring to FIG. 9, which shows a schematic diagram of an execution module in an energy management system of the present application in an embodiment, as shown, the execution module 11 includes a start controller 110, an approximate bitwidth controller 111, and a retention time controller 112.

The approximate bitwidth controller 111 is configured to control the computation precision of the processor according to the data bitwidth instruction when receiving the data bitwidth instruction (Bitwidth) output by the prediction module 10. In the embodiment, the approximate bitwidth controller 111 has one or more nonvolatile shift units, the nonvolatile shift unit is for example a nonvolatile shifter (NV Shifter), and the approximate bitwidth controller 111 stores the received data bitwidth instruction in the nonvolatile shift unit. In some examples, the computation of the processor includes that the processor calculates and processes the sensed data or interaction data acquired by the electronic device.

In some examples, the process of the sensed data includes that, for example, a wearable device performs processing operation to generate user data that is transmitted by a wireless module or displayed by a display device based on the collected heart rate data, blood pressure data, temperature data, blood oxygen saturation data, diet/nutrition information, medical reminders, health related prompts or information, or other health related data.

In some examples, the process of the interaction data includes that, for example, a user operates a wearable device to respond to an event notification generated by a host device. The wearable device receives an event notification from a host device, and present a reminder and a prompt for response to the user. If the user responds to the prompt, the wearable device transmits the response to the host device. For example, the user responds to a telephone call, text message or other communication received at the host device.

The start controller 110 is configured to start the operation of the processor when receiving a start instruction (System Start) output by the prediction module 10. In an embodiment, the start controller 110 has one or more nonvolatile shift units, the nonvolatile shift unit is for example a nonvolatile shifter (NV Shifter), and the start controller 110 stores the received start instruction in the nonvolatile shift unit. In the embodiment, the start controller 110 is, for example, an NVP start trigger controller.

The retention time controller 112 is configured to perform a write operation according to at least one of a write current and write time included in the write strategy instruction when receiving the write strategy instruction (Write Configuration) output by the prediction module 10. In the embodiment, the retention time controller 112 has one or more non-volatile shifting units, the nonvolatile shift unit is for example a non-volatile shifter (NV Shifter). The retention time controller 112 stores the received write strategy instruction in the nonvolatile shift unit. The retention time controller 112 performs a write data operation according to the received write strategy instruction. In an example, for example, the data written to the memory of the electronic device by the write operation is data calculated or processed by the processor, or a recorded and backed-up computation state, etc.

The execution module 11 also receives QoS prediction information (Predicted QoS) output by the prediction module 10, so that the processor predicts potential output quality of a program executed in the electronic device based on different approximate methodologies in dynamic bitwidth execution approximation and dynamic backup data retention time, such that the results of the entire energy management system have QoS control.

Figure 10:
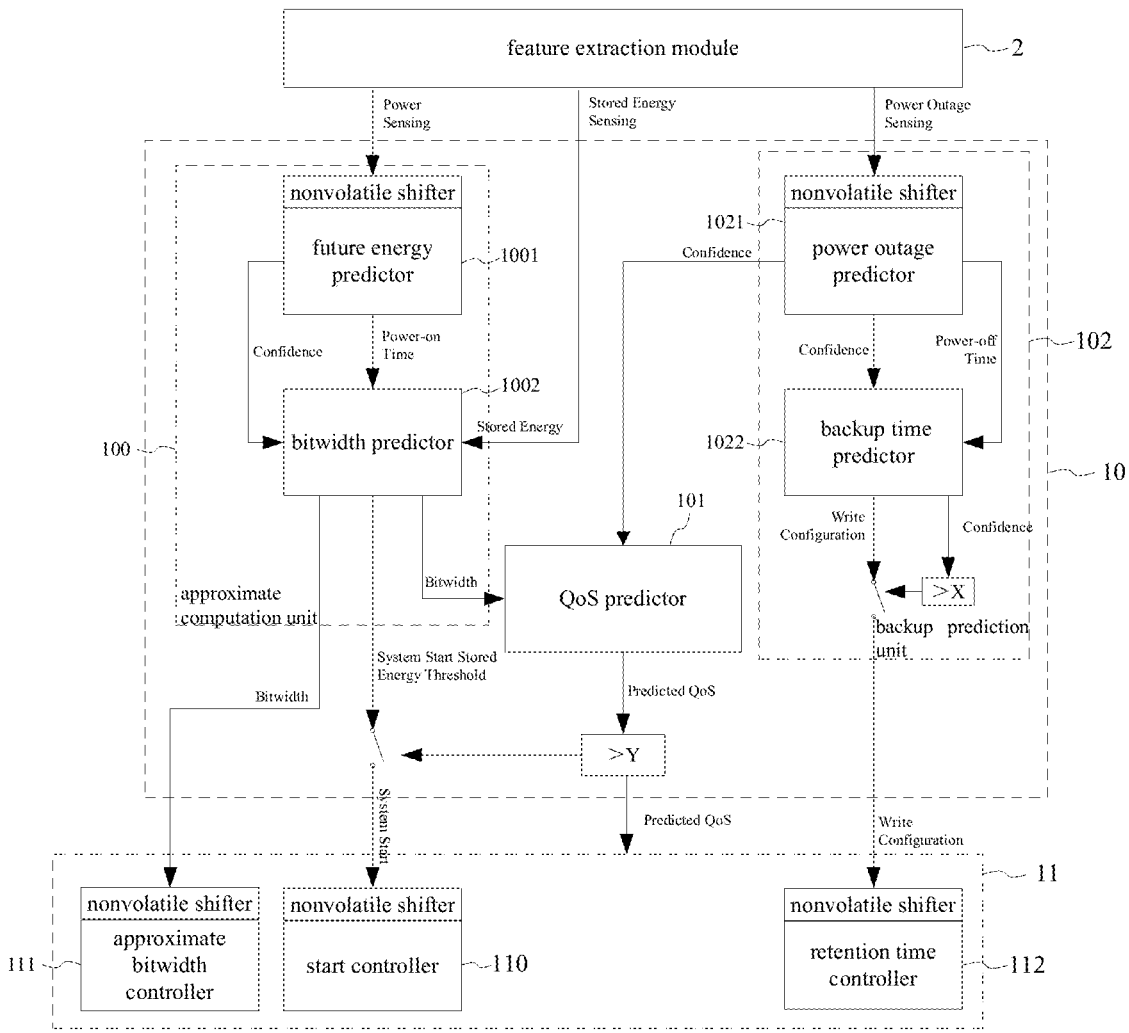
FIG. 10 shows a block diagram of an energy management system of the present application in another embodiment.

In an embodiment, the prediction module 10 performs prediction computation based on the received power supply information (Power Sensing), power storage information (Stored Energy Sensing), and power outage information (Power Outage Sensing) of the electronic device at multiple moments, and respectively outputs a data bitwidth instruction (Bitwidth), a start instruction (System Start) or a write strategy instruction (Write Configuration), and QoS prediction information (Predicted QoS); the execution module 11 performs energy management on operations of the processor based on the at least one instruction, or/and the QoS prediction information output by the prediction module 10. Referring to FIG. 10, which shows a block diagram of an energy management system of the present application in another embodiment, in the embodiment shown in FIG. 10, the energy management system includes an execution module 11 and a prediction module 10, wherein the prediction module 10 is connected to a feature extraction module, and includes an approximate computation unit, a backup prediction unit, and a QoS predictor 101, wherein the approximate computation unit includes a future energy predictor 1001 and a bitwidth predictor 1002; the backup prediction unit includes a power outage predictor 1021 and a backup time predictor 1022; and the execution module 11 includes an approximate bitwidth controller 111 and a start controller 110 connected to the bitwidth predictor 1002, and a retention time controller 112 connected to the backup time predictor 1022.

In the embodiment, the prediction module 10 performs prediction computation by a neural network on the received power supply information, power storage information and power outage information of the electronic device for multiple moments, and outputs a data bitwidth instruction, a start instruction or a write strategy instruction, and QoS prediction information. In a specific implementation, the prediction module 10 implements the prediction on the foregoing information by a time multiplexing hardware architecture, and implements the output of a data bitwidth instruction, a start instruction, or a write strategy instruction and the QoS prediction information by the multiplexing hardware architecture. The time multiplexing may also be referred to as timing based multiplexing or time division multiplexing, and is used to implement various prediction computation in different time periods through a hardware architecture of a neural network predictor, that is, implement prediction computation of multiple small-scale neural networks by using different time periods, thereby saving the hardware cost and area.

Figure 19:
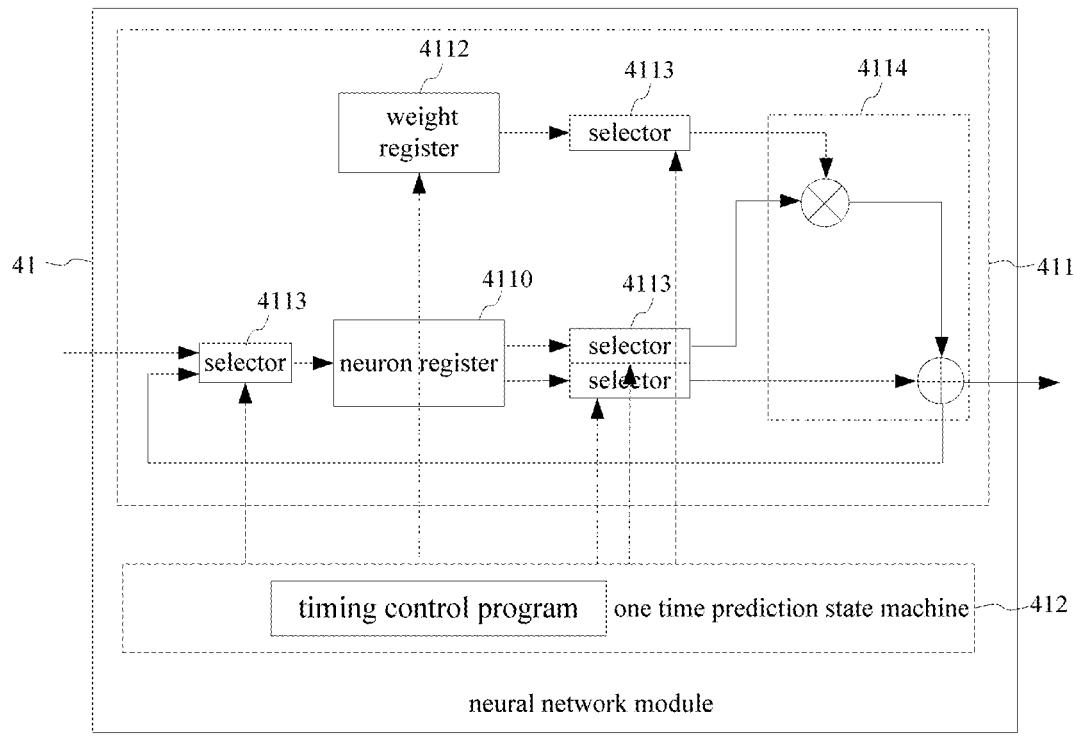
FIG. 19 shows a schematic diagram of hardware architecture of a neural network module in the present application in an embodiment

In an embodiment, the time multiplexing hardware architecture of the prediction module 10 is a hardware architecture in which a plurality of prediction computations shares one neural network module in different periods. In an embodiment, the prediction module 10 includes a neural network module 41 and a timing control module 42. The timing control module 42 is configured to control the timing of the prediction computations in which the neural network module 41 outputs the at least one instruction, or/and the QoS prediction information based on the received at least one type of information. Referring to FIG. 19, which shows a schematic diagram of hardware architecture of a neural network module in the present application in an embodiment, as shown in the figure, in the embodiment, the neural network module 41 includes a neural network unit 411 and a one time prediction state machine 412, wherein the neural network unit 411 includes a neuron register 4110, a weight register 4112 storing multiple weights, a plurality of selectors 4113 for selecting data input or output, and a multiply-and-accumulate unit 4114. The one time prediction state machine 412 is configured to control the timing of one time prediction computation performed by the neural network unit 411 based on the received at least one type of information. The neural network module 41 shown in FIG. 19 is a serial architecture, and according to the input of the neural network unit 411, the one time prediction state machine 412 controls the corresponding selector 4113 to select a source neuron and target neuron that need to be activated and a weight from the weight register 4112, and after calculation, it is transferred to the multiply-and-accumulate (MAC) unit 4114, the result thereof is written back to the neurons in the neural network unit until all neurons in the input layers, the hidden layers, and the output layers are processed. The weights pre-stored in the weight register 4112 are acquired after being trained.

In the embodiment, the weight register 4112 includes a nonvolatile shift unit or a nonvolatile memory unit for storing weight corresponding to each prediction computation, wherein the nonvolatile shift unit is a nonvolatile shifter (NV Shifter), and the nonvolatile memory unit is a non-volatile memory (NVM).

In the embodiment, the one time prediction state machine 412 has a nonvolatile shift unit or a nonvolatile memory unit for storing a timing control program. Specifically, the timing control program is used for controlling timing of output from each selector 4113. The nonvolatile shift unit is a nonvolatile shifter, and the nonvolatile memory unit is a nonvolatile memory.

The timing control module 42 is configured to control the timing of prediction computation in which the neural network module 41 outputs at least one of a data bitwidth instruction (Bitwidth), a start instruction (System Start) or a write strategy instruction (Write Configuration), or/and Qos prediction information (Predicted QoS) based on at least one type of the received power supply information (Power Sensing), power storage information (Stored Energy Sensing) and power outage information (Power Outage Sensing) for at least one moment, to ensure the aforementioned plurality of prediction computations share one neural network module; in other words, the functionality of all of these predictors can be accomplished by one prediction hardware (one neural network architecture).

Figure 20:
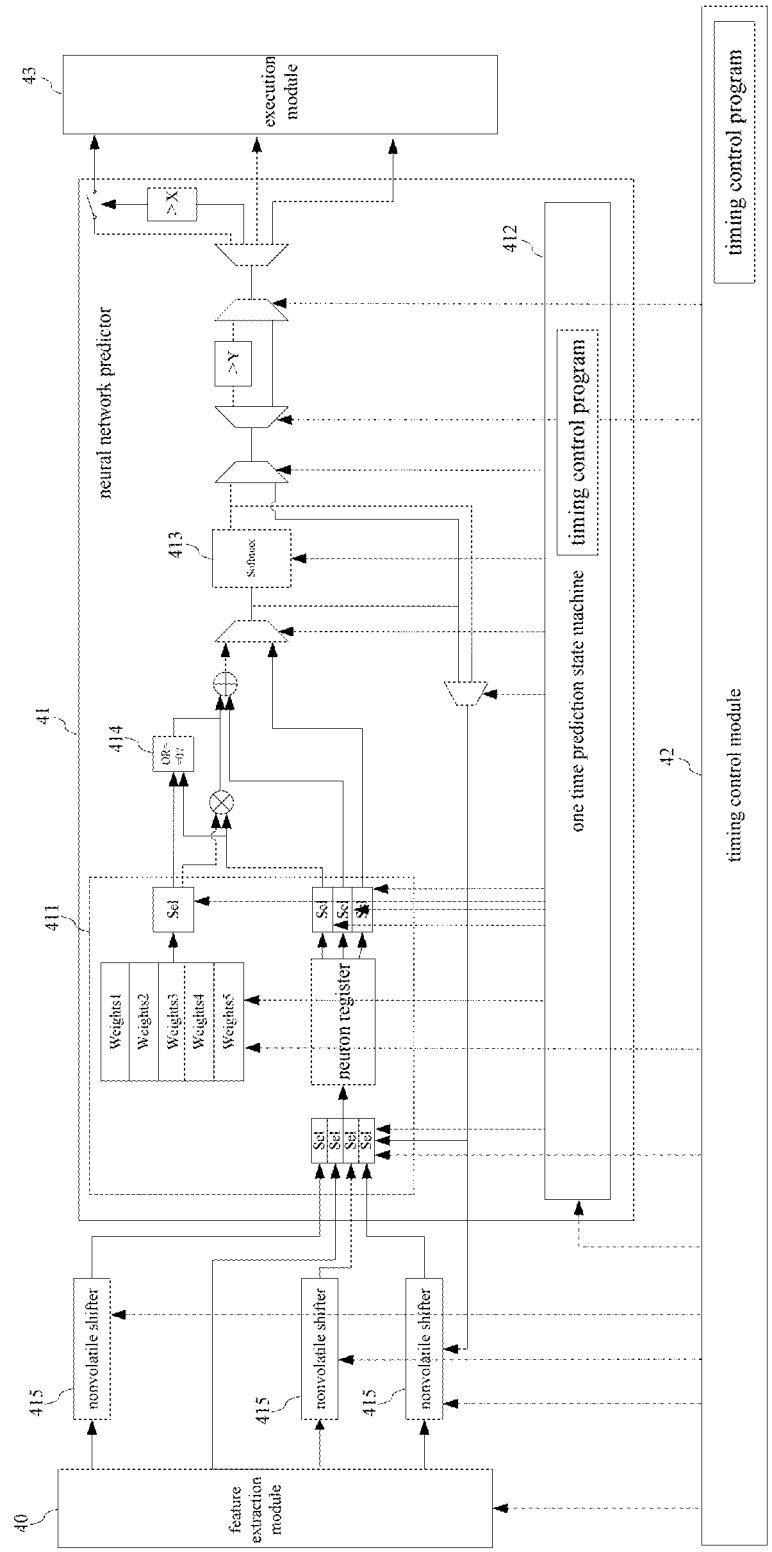
FIG. 20 shows a schematic diagram of hardware architecture of a neural network module in the present application in another embodiment.

Referring to FIG. 20, which shows a schematic diagram of hardware architecture of a neural network module in the present application in another embodiment, in the embodiment shown in FIG. 20, the hardware architecture is regularized in the present application to accomplish various prediction computations in one hardware architecture at different time. As shown, the neural network module 41 further includes a softmax state machine 413 and a determination unit 414 (i.e., a section OR==0 shown in FIG. 20) disposed in the multiply-and-accumulate unit. In the embodiment, to regularize the hardware architecture, a multiple of virtual connections are built in the network by the neural network module 41, and the neural network topology is standardized by inserting Weights 1, Weights 2 . . . Weights 5 in the weight register shown in FIG. 20.

In the embodiment shown in FIG. 20, the one time prediction state machine 412 includes a nonvolatile shift unit used for storing a timing control program. A schematic diagram of the timing of one time prediction computation performed by the neural network unit which is controlled by one time prediction state machine 412 based on the received input information is indicated by dashed line arrows shown in FIG. 20; a schematic diagram of the timing in which the timing control module 42 controls the neural network module is indicated by dotted line arrows shown in FIG. 20.

When the neural network module 41 performs one prediction (such as a prediction of future power-on time or a prediction of future power-off time), the one time prediction state machine 412 controls the selector to perform one calculation on the selected weight and the source neuron and the target neuron that need to be activated, and output the calculated results to the determination unit 414, the determination unit 414 determines whether any of the inputs is 0; if any input is 0, a multiplier is bypassed; and if any input is not 0, multiplication via the multiplier and accumulation are performed, the result thereof is written back to the neurons in the neural network unit 411 until all the neurons in the input layer, the hidden layers, and the output layer are processed. Finally, the softmax layer is performed under the control of the softmax state machine 413. After all the steps are performed by the neural network module, the outputs of the neural network module are then stored in the nonvolatile shift unit 415 of the execution module selectively, and some of the outputs are updated in the nonvolatile memory (NVM) 415 shown in FIG. 6 (for example, the timing control module further controls the neural network module to update the power outage information during a power-on period; or the timing control module controls the neural network module to update the power supply information during a power outage period) for next other prediction such as the power outage prediction confidence or power-on confidence. In the embodiment, a multiplier and an adder in the multiply-and-accumulate unit are a floating point multiplier and a floating point adder.

In the embodiment, the timing control module 42 includes a nonvolatile shift unit or a nonvolatile memory unit used for storing a timing control program, wherein the nonvolatile shift unit is a nonvolatile shifter, and the nonvolatile memory unit is a nonvolatile memory.

In an embodiment, the neural network module implements various prediction computation through a multiplexing hardware architecture, and outputs at least one of a data bitwidth instruction (Bitwidth), a start instruction (System Start) or a write strategy instruction (Write Configuration), or/and Qos prediction information (Predicted QoS) by means of the multiplexing hardware architecture, to perform energy management on operations of the processor. In the embodiment, the neural network unit 411 performs the following prediction computations in a prediction computation process based on at least one type of the received power supply information, power storage information and power outage information of the electronic device for at least one moment:

(1) performing prediction computation based on the received power supply information to obtain future power-on time (Power-on Time) and a power-on confidence (Confidence) of the electronic device;

(2) performing prediction computation based on the received future power-on time, power-on confidence and power storage information (Stored Energy Sensing) to obtain a data bitwidth instruction and a start instruction (System Start);

(3) performing prediction computation based on the received data bitwidth instruction and power outage information (Power Outage Sensing) to obtain QoS prediction information;

(4) performing prediction computation based on the received power outage information (Power Outage Sensing) to obtain future power-off time and a power outage confidence of the electronic device; and (5) performing prediction computation based on the received future power-off time and power outage confidence to obtain a write strategy instruction and a write strategy confidence.

With the above-mentioned time multiplexing-based neural network prediction module, it can be ensured that the operations of the processor is matched with the expected energy thereof through predicting the future power income or power-off time to obtain the data transmission bitwidth or data write strategy and the timing of starting the operations, and the QoS can be matched with the minimum QoS requested in advance through dynamically adjusting the retention time of nonvolatile element according to the write strategy to match the power condition; and in the time multiplexing-based neural network predictor of the present application, multiple of prediction computations can be implemented in different time periods by a hardware architecture of one neural network predictor; in other words, the present application implements prediction computations of multiple small-scale neural networks in different time periods, thereby saving the hardware cost and area.

Referring to FIG. 10, as shown, the future energy predictor 1001 obtains the power supply information (Power Sensing) at a plurality of moments from the feature extraction module, and performs prediction based on the power supply information, and then outputs future power-on time (Power-on Time) and a power-on confidence (Confidence) of the electronic device to the bitwidth predictor 1002; meanwhile the feature extraction module outputs the power storage information (Stored Energy) to the bitwidth predictor 1002, and the bitwidth predictor 1002 is configured to perform approximate computation according to the future power-on time and the power-on confidence and the energy storage information (Stored Energy), and output a data bitwidth instruction (Bitwidth) to the QoS predictor 101 and the approximate bitwidth controller 111; meanwhile, the bitwidth predictor 1002 also performs prediction according to the future power-on time (Power-on Time), the power-on confidence (Confidence), and the power storage information (Stored Energy) output by the feature extraction module and outputs a start threshold (System Start Stored Energy Threshold), and outputs a start instruction (System Start) to the start controller 110 if the start threshold (System Start Stored Energy Threshold) satisfies a threshold Y.

The start controller 110 is configured to start the operation of the processor when receiving the start instruction (System Start) output by the prediction module 10.

The approximate bitwidth controller 111 is configured to control the computation precision of the processor according to the data bitwidth instruction when receiving the data bitwidth instruction (Bitwidth) output by the bitwidth predictor 1002.

The power outage predictor 1021 is configured to perform prediction according to the power outage information (Power Outage Sensing) output by the feature extraction module, and output future power-off time (Power-off Time) to the backup time predictor 1022, and output a power outage confidence (Confidence) to the backup time predictor 1022 and the QoS predictor 101 respectively, wherein, the backup time predictor 1022 is configured to generate the write strategy instruction (Write Configuration) and a write strategy confidence (Confidence) according to the future power-off time (Power-off Time) and the power outage confidence (Confidence), and output the write strategy instruction to the retention time controller 112 when the write strategy confidence satisfies the threshold X.

The retention time controller 112 is configured to perform a write operation according to at least one of a write current and write time included in the write strategy instruction when receiving the write strategy instruction (Write Configuration) output by the backup time predictor 1022.

The QoS predictor 101 performs prediction computation according to the data bitwidth instruction (Bitwidth) and the power outage confidence (Confidence) output by the power outage predictor 1021 to obtain QoS prediction information (Predicted QoS), so that the processor predicts potential output quality of a program executed in the electronic device based on different approximate methodologies in dynamic bitwidth execution approximation and dynamic backup data retention time, such that the results of the entire energy management system have QoS control.

In summary, with the energy management system of the present application, it can be ensured that the operations of the processor is matched with the expected energy thereof through predicting the future power income or power-off time to obtain the data transmission bitwidth or data write strategy and the timing of starting the operations, and the QoS can be matched with the minimum (the most basic) QoS requested in advance through dynamically adjusting the retention time of nonvolatile element according to the write strategy to match the power condition.

The present application further provides an electronic apparatus, the electronic apparatus includes the energy management system described in the above embodiments. In an embodiment, the electronic apparatus is, for example, a chip, and the modules in the aforementioned energy management system (the structure shown in FIG. 10) are built in the chip, including a future energy predictor 1001, a bitwidth predictor 1002, a power outage predictor 1021, a backup time predictor 1022, a QoS predictor 101, a start controller 110, an approximate bitwidth controller 111, and a retention time controller 112. These devices are integrated into the chip in the form of logic processing unit or logic circuit, and the chip shows different package structure depending on the need of application on different electronic device.

In an embodiment, for example, the chip is a microprocessor chip, and the microprocessor is a nonvolatile processor (NVP), and the architecture of the nonvolatile processor includes a future energy predictor 1001, a bitwidth predictor 1002, a power outage predictor 1021, a backup time predictor 1022, a QoS predictor 101, a start controller 110, an approximate bitwidth controller 111, and a retention time controller 112. The processor can be any commercially available processor, controller, microcontroller, or state machine. The processor may also be implemented as a combination of computing devices, such as a combination of DSP and microprocessor, a plurality of microprocessors, one or more microprocessors in coordination with a DSP core, or any other such configuration.

In an embodiment, the electronic apparatus is, for example, a circuit board or a board card provided with integrated circuits or chips. The circuit board is, for example, a double-layer PCB or multi-layer PCB.

The present application also provides a nonvolatile processor (NVP), which includes the aforementioned energy management system. The nonvolatile processor is a microprocessor chip, and the modules in the aforementioned energy management system (the structure shown in FIG. 10) are built in the microprocessor chip, including a future energy predictor 1001, a bitwidth predictor 1002, a power outage predictor 1021, a backup time predictor 1022, a QoS predictor 101, a start controller 110, an approximate bitwidth controller 111, and a retention time controller 112. These devices are integrated into the microprocessor chip in the form of logic processing unit or logic circuit, and the microprocessor chip shows different package structure depending on the need of application on different electronic device.

Figure 11:
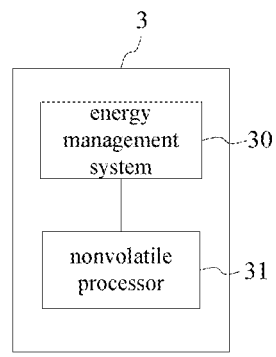
FIG. 11 shows a schematic diagram of an electronic device of the present application in an embodiment.

The present application also provides an electronic device. Referring to FIG. 11, which shows a schematic diagram of an electronic device of the present application in an embodiment, as shown, the electronic device 3 includes a processor 31 and an energy management system 30 as described above. In an embodiment, the processor 31 is, for example, a nonvolatile processor 31 (NVP), but is not limited thereto. In other embodiments, without departing from the inventive concept and ideas disclosed herein, the processor is a conventional processor, such as any commercially available processor, controller, microcontroller, or state machine. The processor may also be implemented as a combination of computing devices, such as a combination of a DSP and a microprocessor, a plurality of microprocessors, one or more microprocessors in coordination with a DSP core, or any other such configuration.

In the embodiments provided by the present application, the electronic device is an IoT device, such as a wearable device or an implantable device. For example, the wearable electronic device includes any type of electronic device that can be worn on a user. The wearable electronic device can be fixed to a human body such as a wrist, ankle, arm or leg. Such electronic device includes, but is not limited to, health or fitness assistant device, digital music player, smart phone, computing device or display, exercise or other activity monitor, device capable of telling time, device capable of measuring biometric parameter of a wearer or user, etc. The implantable device is, for example, a blood glucose detecting device or the like.

As an example, the wearable electronic device is implemented in the form of a wearable health assistant, which provides health related information (real time or non-real time) to the user, an authorized third party, and/or an associated monitoring device. The device is configured to provide health related information or data such as, but not limited to, heart rate data, blood pressure data, temperature data, blood oxygen saturation data, diet/nutrition information, medical reminders, health related prompts or information, or other health related data. The associated monitoring device is, for example, a tablet computing device, a phone, a personal digital assistant, a computer, or the like.

As another example, the electronic device is configured in the form of a wearable communication device. The wearable communication device includes one or more communication interfaces, an output device (such as a display and a speaker), one or more input devices, and a processor coupled to or in communication with a memory. The one or more communication interfaces provides electronic communication between the communication device and any external communication network, device or platform. The interface is such as, but not limited to, a wireless interface, a Bluetooth interface, a USB interface, a Wi-Fi interface, a TCP/IP interface, a network communication interface or any conventional communication interface. In addition to communication, the wearable communication device provides information, message, video, operational commands and so on (and can receive any of the above-mentioned items from an external device) about time, health, status, or an externally connected device or a device that is communicating with the wearable device, and/or software running on such devices.

Figure 12:
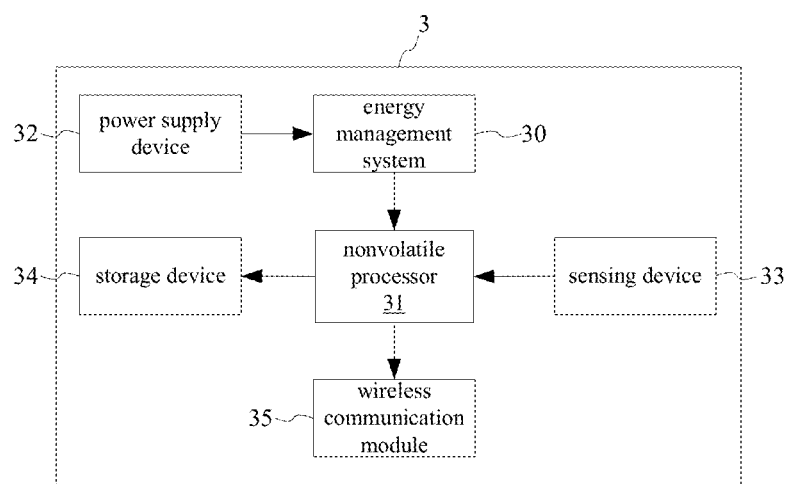
FIG. 12 shows a schematic diagram of an electronic device of the present application in another embodiment.

Referring to FIG. 12, which shows a schematic diagram of an electronic device of the present application in another embodiment, as shown, in an embodiment, the electronic device further includes a power supply device 32 used for generating or storing electrical energy. In the embodiment, the power supply device 32 is, for example, a battery or a self-powered system, and the self-powered system includes an energy harvester, which obtains energy from human motion, for example, obtains vibration energy generated by human actions or behaviors such as walking or swinging of limb, jumping, pressing (such as pressure obtained by a small energy harvester implanted in a shoe during running), and breathing, and converts the vibration energy into electric energy. In other embodiments, the energy is from the natural environment, such as solar energy. The electric energy harvested by the power supply device 32 is processed from AC to DC or DC to DC, and then the harvested energy is temporarily stored in an off-chip or even on-chip capacitor which is mainly used for supporting data rather than storing energy.

In an embodiment, as shown in FIG. 12, the electronic device further includes one or more sensing devices 33, and the one or more sensing devices 33 are configured to sense at least one of geographic location information, ambient light information, environmental magnetic field information, sound information, temperature information, humidity information, pressure sensing information, acceleration information, ultraviolet information, blood sugar information, alcohol concentration information, pulse information, heart rate information, breath information, and exercise amount information.

In an embodiment, the sensors include various electronic devices, mechanical devices, electromechanical devices, optical devices, or other devices that provide information related to external condition surrounding the wearable device. In some embodiments, the sensor provides digital signals to a processing subsystem, for example, the sensor provides digital signals to a processing subsystem in the manner of streaming as needed or in response to polling by the processing subsystem. Any types of environmental sensors and combination thereof can be used; for example, an accelerometer, a magnetometer, a gyroscope, and a GPS receiver.

Some environmental sensors provide information about the position and/or motion of the wearable device. For example, an accelerometer senses an acceleration along one or more axes (relative to free fall), and generates a signal by using a piezoelectric component or other component in conjunction with associated electronic apparatus. A magnetometer senses an ambient magnetic field (e.g. magnetic field of the earth) and generates a corresponding electrical signal that can be interpreted as the compass direction. A gyro sensor senses rotational motion in one or more directions, for example through one or more MEMS (Micro Electro Mechanical Systems) gyroscopes and associated control and sensing circuitry. A Global Positioning System (GPS) receiver determines the location based on a signal received from a GPS satellite.

In addition to or in place of these examples, other sensors are included. For example, a decibel level of an ambient sound is determined by a sound sensor combined with a microphone along with associated circuitry and/or program codes. And a temperature sensor, a proximity sensor, an ambient light sensor, a biometric sensor/physiological feature sensor such as a heartbeat, breath, pulse, blood sugar, or alcohol concentration detection sensor, and so on are also included. In some embodiments, a physiological or biometric sensor is used to verify the identity of the wearer of the wearable device.

In an embodiment, as shown in FIG. 12, the electronic device further includes a storage device 34 used for storing data output by the processor. In some examples, the storage device 34 is an NVM (Non-volatile memory, abbreviated as NVM), a read-only memory (ROM), a random access memory (RAM), an EEPROM, a CD-ROM or a disk storage device or other magnetic storage device, a flash memory, or any other medium that can be used to store desired program codes in the form of an instruction or data structure and can be accessed by a computer. Furthermore, any connection can be properly called a computer-readable medium.

In an embodiment, as shown in FIG. 12, the electronic device further includes a wireless communication module 35 configured to send data output by the processor or receive data wirelessly transmitted by an external device. The communication interface of the wireless communication module is such as, but not limited to, a wireless interface, a Bluetooth interface, a USB interface, a Wi-Fi interface, a TCP/IP interface, a network communication interface or any conventional communication interface.

The application also provides an energy management method, the energy management method is applied in an electronic device with a processor. In an embodiment, the processor is a nonvolatile processor (NVP).

In the embodiments provided by the present application, the electronic device is an IoT device, such as a wearable device or an implantable device. For example, the wearable electronic device includes any type of electronic device that can be worn on a user. The wearable electronic device can be fixed to a human body such as a wrist, ankle, arm or leg. Such electronic device includes, but is not limited to, health or fitness assistant device, digital music player, smart phone, computing device or display, exercise or other activity monitor, device capable of telling time, device capable of measuring biometric parameter of a wearer or user, etc. The implantable device is, for example, a blood glucose detecting device or the like.

Figure 13:
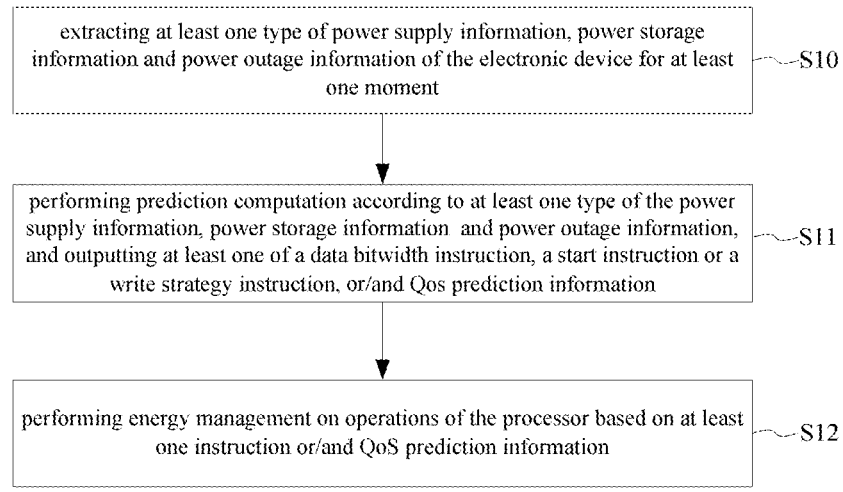
FIG. 13 shows a flow diagram of an energy management method of the present application in an embodiment.

In an embodiment, the present application further provides an energy management method applied to an electronic device with a processor. In the embodiment, for the description of the electronic device, please refer to the corresponding description in the embodiments described above in conjunction with FIGS. 1 to 12, and it will not be repeated here. Referring to FIG. 13, which shows a flow diagram of an energy management method of the present application in an embodiment, as shown, the energy management method includes the following steps:

Step S10: extracting at least one type of power supply information (Power Sensing), power storage information (Stored Energy Sensing) and power outage information (Power Outage Sensing) of the electronic device for at least one moment. In some embodiments, the moments indicate different time periods, and are divided into multiple time levels according to different requirements, such as 10 ms, 100 ms, 1 s, 2 s, 3 s, 10 s, 1 minute, 10 minutes, 1 hour, 1 day, etc. It should be noted that the above moments are exemplary, and are not limited thereto in different implementations.

In an embodiment, the power supply information, power storage information and power outage information of the electronic device for one or more moments are extracted, for example the power supply information of the electronic device for the most recent 10 historical moments, the power storage information of the electronic device for the most recent 10 historical moments, and the power outage information of the electronic device for the most recent 10 historical moments are extracted to the prediction module 10 for prediction. In an example, the power supply information of the electronic device for the most recent 10 historical moments are the most recent 10 consecutive power-on moments, or the power storage information of the electronic device for the most recent 10 historical moments are the remaining powers for the most recent 10 moments, or the power outage information of the electric device for the most recent 10 historical moments are the power outage durations for the most recent 10 moments.

In an embodiment of step S10, power supply information of the electronic device for at least one moment is obtained by a feature extraction module when detecting that the electronic device is powered on or during a power-on period of the electronic device.

In another embodiment of step S10, power storage information of the electronic device for at least one moment is obtained by a feature extraction module when detecting that the electronic device is powered on or during a power-on period of the electronic device.

In yet another embodiment of step S10, power outage information of the electronic device for at least one moment is obtained by a feature extraction when detecting that the electronic device is powered off or during a power-on period of the electronic device.

In some embodiments, the power supply information is power-on information of the electronic device, and the power supply information is generated by a self-powered system such as an energy harvester of the electronic device, which obtains energy from human motion, for example, obtains vibration energy generated by human actions or behaviors such as walking or swinging of limb, jumping, pressing (such as pressure obtained by a small energy harvester implanted in a shoe during running), and breathing, and converts the vibration energy into electric energy. In other embodiments, the energy is from the natural environment, such as solar energy. The electric energy harvested by the energy harvester is processed from AC to DC or DC to DC, and then the harvested energy is temporarily stored in an off-chip or even on-chip capacitor which is mainly used for supporting data rather than storing energy.

In some embodiments, the power storage information is information on the electric quantity stored in a battery or power storing capacitor of the electronic device, such as information on the stored power acquired in real time or intermittently if the power consumption is assumed to be constant.

In some embodiments, the power outage information is information about power income interruption in the electronic device caused by insufficient energy supply, or energy exhaustion, or human factors (such as artificial settings or damages) or unforeseeable accidents, for example, the information is the power-off time, power outage duration and so on. In an embodiment, ten levels of power-off time are set, such as 10 ms, 100 ms, 1 s, 2 s, 3 s, 10 s, 1 minute, 10 minutes, 1 hour, 1 day, or other different time periods.

In an embodiment, the extraction of power supply information (Power Sensing), power storage information (Stored Energy Sensing) and power outage information (Power Outage Sensing) of the electronic device for at least one moment is implemented by the circuitry of the feature extraction module shown in FIG. 4.

In an embodiment, the step of extracting power supply information of the electronic device for at least one moment includes acquiring the power supply information of the electronic device by collecting a value of current flowing through a detecting element or a value of voltage across the detecting element, wherein the power supply information is power-on information of the electronic device, and the power supply information is generated by a self-powered system of the electronic device. In the embodiment shown in FIG. 4, the feature extraction module of the front-end circuitry includes a power source which is a battery for example or which includes a charging device, wherein one end of the power source is grounded, and the other end thereof is connected to an Rs resistor, the Rs resistor is used as a detecting element. The feature extraction module acquires the power supply information supplied to the electronic device to the prediction module by collecting a value of current flowing through the detecting element Rs or a voltage value across it. The Rs resistor and a 6-bit ADC converter in FIG. 4 constitute the detection unit in the embodiment, used for detecting and obtaining the power supply information.

In an embodiment, the step of extracting power storage information of the electronic device for at least one moment includes acquiring the power storage information of the electronic device by collecting a voltage drop of an energy storage element, that is, acquiring the power storage information (i.e. the remaining power of the energy storage element) by collecting a voltage difference (voltage drop) across the energy storage element. In the embodiment shown in FIG. 4, the energy storage element is a grounding capacitor C1 in FIG. 4 The capacitor C1 and the ADC converter in FIG. 4 constitute the energy storage unit in the embodiment.

In an embodiment, the step of extracting power outage information of the electronic device for at least one moment includes acquiring the power outage information by collecting a voltage drop across a leak element, specifically, by checking the voltage of the capacitor when the electronic device is recovered from a power outage, the power-off time of the system is calculated through the sensed voltage drop. In the embodiment as shown in FIG. 4, the power outage sensing unit is configured to acquire the power outage information including power-off time by collecting a voltage difference across a leak element. The leak element is a leak capacitor C2 in FIG. 4, wherein one end of the leak capacitor C2 is connected to an LDO device via a DC-DC converter and a charge breaker, and the other end of the leak capacitor C2 is grounded. In a particular implementation, the leak capacitor C2 is charged every time during a restore operation controlled by the charge breaker. The DC-DC converter, the LDO device, the charge breaker, the leak capacitor C2, and the ADC converter in FIG. 4 constitute the power outage sensing unit, as shown in FIG. 4. By charging the leak capacitor every time during a restore operation controlled by the LDO, as shown in FIG. 4, and by checking the voltage of the capacitor when the electronic device is recovered from a power outage, the power-off time of the system is calculated through a voltage drop sensed by the ADC.

In an embodiment, the extracted power supply information, power storage information, and power outage information (i.e. Sensing Results information shown in FIG. 4) of the electronic device for one or more moments are respectively stored in a nonvolatile shift unit, the nonvolatile shift unit is a nonvolatile shifter (NV Shifter) for example.

Then, step S11 is performed. performing prediction computation according to at least one type of the power supply information (Power Sensing), power storage information (Stored Energy Sensing) and power outage information (Power Outage Sensing), and outputting at least one of a data bitwidth instruction (Bitwidth), a start instruction (System Start) or a write strategy instruction (Write Configuration), or/and Qos prediction information (Predicted QoS).

In an embodiment, performing step S11 includes performing prediction computation, by one or more neural networks, on at least one type of the power supply information, power storage information and power outage information for at least one moment, and outputting at least one of a data bitwidth instruction, a start instruction or a write strategy instruction, or/and QoS prediction information. In an example, the neural network is, for example, a feedforward neural network, which is an offline trained neural network or an online back-propagation trained neural network.

Referring to a neural network in FIG. 2, which shows a schematic diagram of a neural network for a prediction module in an energy management system of the present application in an embodiment, as shown, in the embodiment, for example, the neural network is a feedforward neural network, which includes one input layer, two hidden layers (Hidden Layer 1, 2), and one output layer, wherein each layer has 10 neurons, and each neuron has 10 outputs. The feedforward neural network predicts the electric energy generated in the future or possible interrupted time in the future based on power supply information, power storage information or power outage information for 10 moments (from On time_1 to On time_10) received from a nonvolatile shifter (NV Shifter). However, it is not limited thereto. In other embodiments, as in another neural network structure in FIG. 3, as shown, the feedforward neural network includes more hidden layers (Hidden Layer 1, 2 . . . N), and each layer also includes more or fewer neurons (N). The neural network shown in FIG. 3 is an offline trained neural network or an online back-propagation trained neural network.

In step S11, prediction computation is performed according to the at least one type of information, and at least one of a data bitwidth instruction, a start instruction or a write strategy instruction, and/or QoS prediction information are/is output, that is, by performing step S11, it can be ensured that the operations of the processor is matched with the expected energy thereof through predicting the future power income or power-off time to obtain the data transmission bitwidth or data write strategy and the timing of starting the operations, and output the prediction information to the processor. In addition, the QoS can be matched with the minimum (the most basic) QoS requested in advance through dynamically adjusting the retention time of non-volatile element according to the write strategy to match the power condition.

Figure 14:
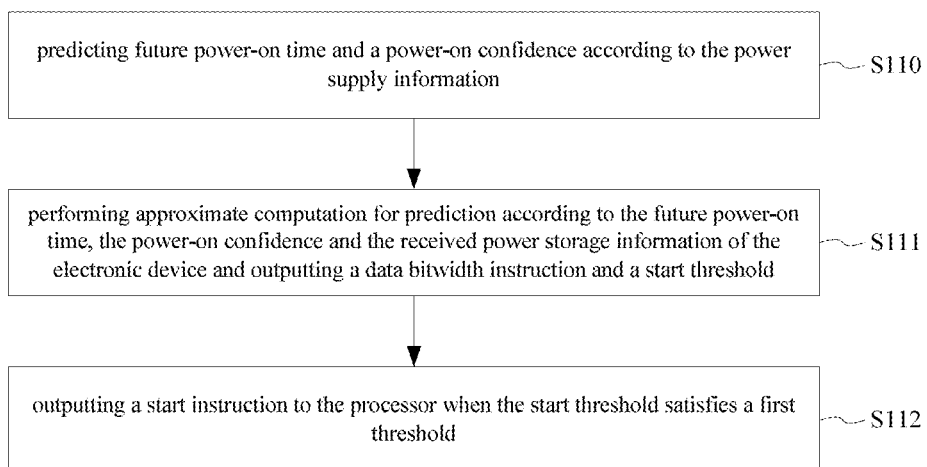
FIG. 14 shows a flow diagram of step S11 in an energy management method of the present application in an embodiment.

In an embodiment, the step of performing prediction computation according to at least one type of the power supply information (Power Sensing), power storage information (Stored Energy Sensing) and power outage information (Power Outage Sensing), and outputting at least one of a data bitwidth instruction, a start instruction or a write strategy instruction, or/and Qos prediction information includes performing approximate computation for prediction according to the power supply information and the power storage information, and outputting the data bitwidth instruction and the start instruction. Referring to FIG. 14, which shows a flow diagram of step S11 in an energy management method of the present application in an embodiment, as shown, in the embodiment, step S11 further includes the following steps:

Step S110: predicting future power-on time and a power-on confidence according to the power supply information; in the embodiment, taking an example of performing prediction computation, by a feedforward neural network, on the received most recent 10 consecutive power-on moments of the electronic device, a counter (not shown) is used to calculate the power-on time, and the counter pushes the last calculated power-on time to the nonvolatile shifter to replace the earliest power-on time.

In the embodiment, a fully connected feedforward neural network with 2 hidden layers is set, and each layer is set with 10 neurons, wherein 10 neurons of the output layer output 10 potential energy levels (energy grades), and each energy level is converted and corresponding to a power-on time, and each output indicates a power-on confidence, when the power-on confidence is very distinct from the others, the highest of which is output as the predicted energy level and its confidence. In a situation, if the top several predicted power-on confidences are within a range of 10%, the predicted energy levels corresponding to future power-on times are weighted averaged, and the corresponding power-on confidences are also averaged.

Step S111: performing approximate computation for prediction according to the future power-on time, the power-on confidence and the received power storage information (Stored Energy Sensing) of the electronic device and outputting a data bitwidth instruction (Bitwidth) and a start threshold (System Start Stored Energy Threshold).

In the embodiment, prediction is performed by a feedforward neural network to output a data bitwidth instruction and a start threshold. The feedforward neural network receives the energy level corresponding to future power-on time, power-on confidence and the stored energy level contained in the power storage information as inputs, wherein the feedforward neural network includes a input layer, 2 hidden layers, and 1 output layer, each layer has 10 neurons, and each neuron has 10 outputs. The output layer outputs two kinds of information: one for bitwidth, consisting of 8 outputs, each of which stands for configuration of bitwidth 1 to 8 (highest will be selected as bitwidth configuration), and another for NVP start threshold, meaning "should the NVP start now or waiting until there are enough stored energy higher than predicted threshold".

In the embodiment, the feedforward neural network is also used to determine an output data bitwidth through prediction, that is, performing approximate computation for prediction according to the 10 potential energy levels (energy grades) and the power-on confidence corresponding to each energy level which are received by the input layer of the feedforward neural network, and determine a proper output data bitwidth so as to determine at which energy level and with which precision the processor performs operations, that is, dynamically collecting the required bitwidth during each boot interval, thereby reducing computing and backup costs of the processor and shortening response time.

In the embodiment, the process of performing approximate computation according to the future power-on time, the power-on confidence, and the power storage information of the electronic device to obtain a data bitwidth instruction is as follows:

First, prediction computation is performed according to the future power-on time, the power-on confidence, and the power storage information of the electronic device to obtain approximate configuration data (Approx Config); in the embodiment, when the 10 potential energy levels (energy grades) and the power-on confidence corresponding to each energy level are received by the neural network for the bitwidth predictor, the approximate configuration data is computed through prediction performed by the two hidden layers, wherein the approximate configuration data includes bitwidth information obtained by the bitwidth predictor through performing prediction computation by the neural network according to the future power-on time, the power-on confidence, and the power storage information, such as how many bits (bitwidth) the processor uses to perform the computation to determine the correct or proper bitwidth configuration.

And then, the approximate configuration data (Approx Config) is identified according to preset approximate identification data (ACEN), and when it is determined that the approximate configuration data can be approximated, an approximate computation is performed to generate a data bitwidth instruction (Bitwidth). In the embodiment, the approximate identification data (ACEN) is preset, specifically, the approximate identification data is data identified by a programmer that can be approximated. Such data include data buffer or image excluding essential variables like the index in a "for" loop.

The process of performing approximate computation according to the future power-on time, the power-on confidence, and the power storage information of the electronic device to obtain a data bitwidth instruction is implemented by the approximate computing architecture described with FIG. 17 in the above embodiment, and will not be repeated herein.

Step S112: outputting a start instruction to the processor when the start threshold satisfies a first threshold. In the embodiment, when the input layer of the feedforward neural network receives the 10 potential energy levels (energy grades) and the power-on confidence corresponding to each energy level, the start threshold is output after prediction computation by the two hidden layers and is as an indication of whether to start.

For example, if the predicted potential energy level is relatively low and the stored energy in the buffer capacitor is insufficient, the start is not implemented; if the predicted potential input energy is high, but the received power-on confidence is relatively low, the start is implemented only when the stored energy level is high enough to reach the predicted threshold; and if the predicted potential input energy is high and the power-on confidence is relatively high, the start is still instructed to be implemented (the predictor outputs a very low threshold) even if the stored energy is relatively low, to achieve a better forward progress and QoS satisfaction. In an example, the power-on confidence being relatively low is, for example, smaller than 30%, and the power-on confidence being relatively high is, for example, greater than 70%. However, it is not limited thereto. In the case of knowing the innovative idea of the present application, the threshold of the power-on confidence can be dynamically adjusted according to the actual situation.

Figure 15:
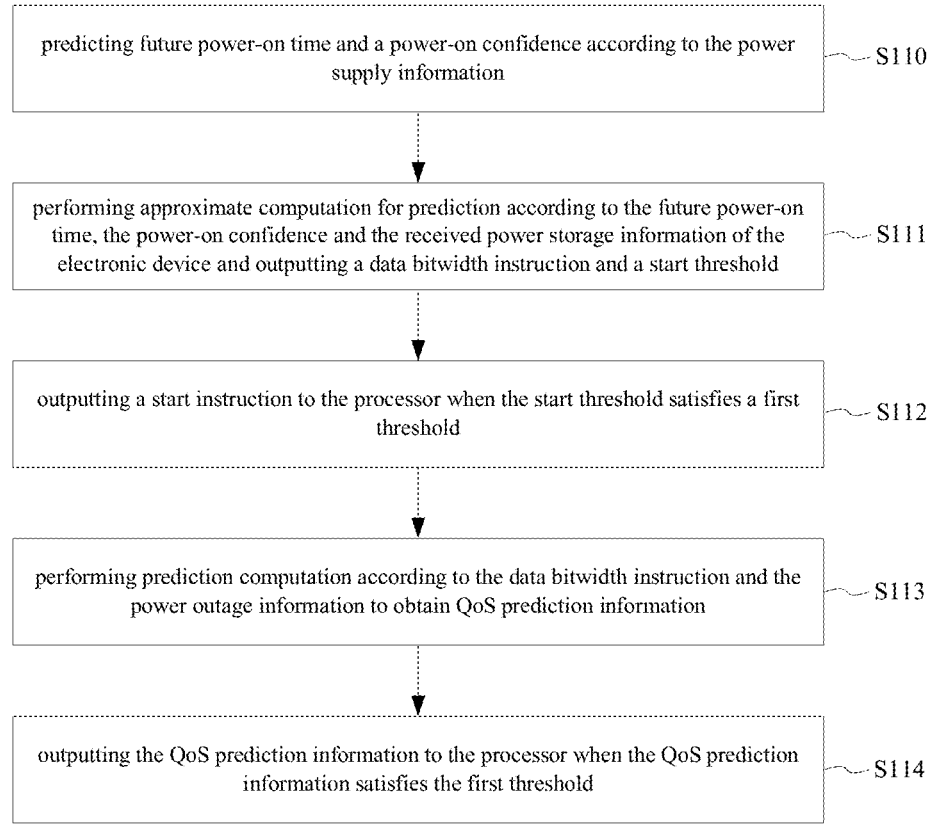
FIG. 15 shows a flow diagram of step S11 in an energy management method of the present application in another embodiment.

In an embodiment, to avoid low-quality data output by the electronic device, wherein the low quality data is for example data below 20 dB, correspondingly data of 20 dB and above is generally considered to be reasonable-quality data, referring to FIG. 15, which shows a flow diagram of step S11 in an energy management method of the present application in another embodiment, as shown, step S11 further includes the following steps:

Step S113: performing prediction computation according to the data bitwidth instruction and the power outage information to obtain QoS prediction information (Predicted QoS), the power outage information includes a power outage confidence; in an embodiment, the power outage confidence is obtained through prediction by a power outage predictor.

In the embodiment, an approximate bitwidth and an averaged power outage prediction confidence are acquired during the time that a frame is processed as input. In the embodiment, the first threshold is, for example, 20 dB, but is not limited thereto. In different implementation states, for example, for different types of electronic device, different thresholds can be set..

Step S114: outputting the QoS prediction information (Predicted QoS) to the processor when the QoS prediction information satisfies the first threshold.

Since the high bitwidth operation (the computation precision of processor is high) dissipates more power than the low bitwidth operation (the computation precision of processor is low), the processor is controlled to start a stored energy threshold in the present application, so that the problem of low quality output can be alleviated in the case the energy management is reasonable, and the start moment of the processor is delayed by controlling the parameter of the first threshold until there are sufficient energy in the energy storage capacitor and then starting the processor, so that high quality data operation or output can be ensured under a reasonable energy management mechanism.

Figure 16:
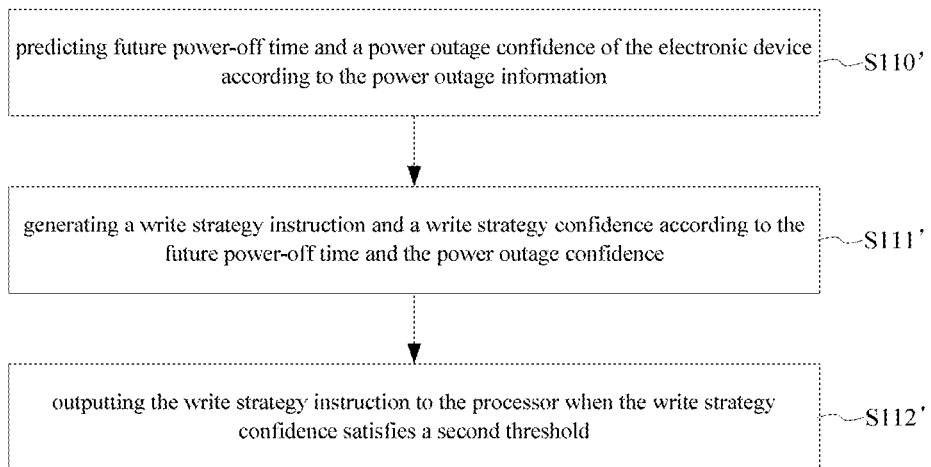
FIG. 16 shows a flow diagram of step S11 in an energy management method of the present application in yet another embodiment.

Although many electronic devices can be powered by unstable power sources (such as energy harvesters in self-powered systems) with the help of nonvolatile components, the backup operation of the electronic devices during working still consumes a lot of electric energy, especially when the power supply is intermittent high. Therefore, if the power outage information can be obtained in advance through a certain technology, and the retention time of an NVM (Non-volatile memory, abbreviated as NVM) is shortened from a long time (such as 10 years or more) to only slightly longer than the power-off time, necessary energy can be saved during the data backup operation. In addition, as an electronic device is usually provided with a block/distributed nonvolatile memory (NVM), the system often consumes a great deal of backup energy during data backup operations. To avoid this unnecessary consumption, backup retention time can be improved to reduce backup energy, thereby achieving energy saving control. To this end, in the present application, a reasonable write strategy is determined by predicting the power-off time, in other words, the data backup time is determined based on the write current is used at what time and in what magnitude. Referring to FIG. 16, which shows a flow diagram of step S11 in an energy management method of the present application in yet another embodiment, as shown, step S11 further includes the following steps:

Step S110': predicting future power-off time and a power outage confidence of the electronic device according to the power outage information. In the embodiment, future power-off time and a power outage confidence are predicted according to the power outage information (Power Outage Sensing) at a plurality of moments. In an example, the power outage information is information about power income interruption in the electronic device caused by insufficient energy supply, or energy exhaustion, or other factors such as artificial settings or unforeseeable accidents, for example, the information is the power-off time, power outage duration and so on. In an embodiment, ten levels of power-off time are set, such as 10 ms, 100 ms, 1 s, 2 s, 3 s, 10 s, 1 minute, 10 minutes, 1 hour, 1 day, or other different time periods.

In an example, the power outage information is collected by a power-off sensing unit in the feature extraction module shown in FIG. 4. For example, the DC-DC converter, the LDO device, the charge breaker, the leak capacitor C2 and the ADC converter in FIG. 4 constitute a power outage sensing unit. By charging the leak capacitor every time during a restore operation controlled by the charge breaker, as shown in FIG. 4, and by checking the voltage of the capacitor when the electronic device is recovered from a power outage, the power-off time of the system is calculated through a voltage drop sensed by the ADC. In detail, as shown in the section of the power outage sensing unit in FIG. 4. When the system is powered on each time (before a restore operation), the leak capacitor is charged in full stable voltage. When power failure happens, the voltage on the leak capacitor drops over time. The power-off time of detection is obtained by measuring the remaining voltage on the leak capacitor after next powered-on. In the embodiment, the received power outage information (Power Outage Sensing) of the electronic device at one or more moments is stored in the nonvolatile shift unit. In an example, taking an example of the received most recent 10 consecutive power-off information of the electronic device, a counter (not shown) is used to calculate the power-off time, and the counter pushes the last calculated power-off time to the nonvolatile shifter to replace the earliest power-off time.

In the embodiment, a fully connected feedforward neural network having 1 input layer, 2 hidden layers, and 1 output layer is configured, and each layer has 10 neurons, the input layer is configured to receive power outage information such as 10 historical power-off time from the nonvolatile shift unit, and the 2 hidden layers of the feedforward neural network is used to compute the power outage information, the output layer outputs predicted results such as future power-off times corresponding to 10 power outage time levels and power outage confidence corresponding to each future power-off time.

Step S111': generating a write strategy instruction and a write strategy confidence according to the future power-off time and the power outage confidence; the write strategy instruction includes at least one of a write current and write time for writing data. The write time is the duration of data write. In a specific implementation, the duration of data write is determined by the write pulse width. The write current and the write pulse width can affect the retention (holding or backup) time of the written data. In the embodiment, the write strategy instruction is a retention time configuration containing written data or is a retention time strategy, and the backup retention time can be improved by the control of the write strategy to reduce the backup energy, thereby achieving the energy saving purpose.

In an embodiment, step S111' further includes performing prediction computation according to the future power-off time and the power outage confidence, and obtaining the write strategy instruction by weighing the write current and the write time in the write strategy instruction. In the embodiment, the purpose of weighing the write current and write time in the write strategy instruction is to find an optimal write strategy, that is, performing a data write operation with the minimum write current and the shortest write time.

As shown in FIG. 8, when the write strategy determines that the retention time of the written data is 10 ms, the write current and the write pulse width in the profile composed of square dots in FIG. 8 are adopted, in the profile, to weigh the write current and the write time, the write current and the write pulse width corresponding to the coordinates of the vertex at the upper right corner of a small square illustrated in FIG. 8 (i.e. point "a" indicated by an arrow in FIG. 8) are used; correspondingly, when the write strategy determines that the retention time of the written data is 1 day, the write current and the write pulse width in the profile composed of round dots in FIG. 8 are adopted, in the profile, to weigh the write current and the write time, the write current and the write pulse width corresponding to the coordinates of the vertex at the upper right corner of a large square illustrated in FIG. 8 (i.e. point "b" indicated by an arrow in FIG. 8) are used; likewise, when the write strategy determines that the retention time of the written data is 1 minute or 1 second, the write current and the write pulse width in the profile composed of triangular dots or inverted triangular dots in FIG. 8 are adopted, in the profiles, to weigh the write current and the write time, the write current and the write pulse width corresponding to the coordinates of the vertex at the upper right corner of a square illustrated in FIG. 8 (i.e. point "c" or "d" indicated by an arrow in FIG. 8) are used.

Since the write current and write pulse width for data can affect the retention (holding or backup) time of the written data, the present application provides a write current. Referring to FIG. 18, which shows a schematic diagram of a write operation circuit of the present application in an embodiment, as shown, according to the write current and the write time determined from the write strategy instruction, current mirror generates different currents, and counter determines different time, and write data MUX array shown in FIG. 18 controls the selection of current, so as to determine the magnitude of the current used for writing data, such as eight path circuits denoted by $I_1$ to $I_8$, different durations are selected by a write time comparator shown to determine how much time is used to write data.

In FIG. 18, $I_{ref}$ is a reference current of the current mirror, different write currents from $I_1$ to $I_8$ are generated by changing the W/L ratio (the width-to-length ratio of the transistor channel, which can determine the amplification factor of the current mirror) of the current mirror composed of PMOS transistors. In this embodiment, the maximum current variation rate is from 1 day to 10 ms. According to the predicted write current configuration in the figure, different currents are selected in the MUX array, and the write current is connected to either "Bit" or "Bit B" (write data can be changed by flipping the current direction of "Bit" or "Bit B"), specifically depending on the input of the "write data" signal. The other line of "Bit" or "Bit B" controls the write time. Using a high frequent 4-bit counter (sub ns per cycle), the counted time of the counter is compared with the predicted write time configuration as shown in the figure. Once the counter time reaches preset write time, the write operation is terminated by disconnecting the connection to GND. In the embodiment, data is written into the memory by performing the write operation, and the memory is an NVM (Non-volatile memory, abbreviated as NVM), such as STT-RAM (Shared Transistor Technology Random Access Memory).

Step S112': outputting the write strategy instruction to the processor when the write strategy confidence satisfies a second threshold. In the embodiment, the write strategy instruction is output to the processor when the write strategy confidence satisfies a second threshold X, wherein the second threshold X is a preset power outage confidence. When the power outage confidence obtained through prediction by the neural network is greater than the preset power outage confidence X, the write strategy instruction is transmitted to the processor. In different implementation states, the second threshold X can be set to different values, and the different implementation state includes a medium of a storage device for write data, such as an STT-RAM (Shared Transistor Technology Random Access Memory) or the like; in addition, these different implementation state also includes different data content that the processor requires to record, and so on.

In the embodiment, the aforementioned steps S111' to S112' are implemented by a neural network, for example, the neural network is a feedforward neural network, which is an offline trained neural network or an online back-propagation trained neural network. The feedforward neural network is of the network structure as shown in FIG. 2 or 3. For example, the neural network is configured as a time backup predictor for prediction computation to obtain a write strategy instruction (Write Configuration) and a write strategy confidence (Confidence).

In an embodiment, when it is predicted that the power-off time is relatively short, for example the power-off time is less than 50 ms or the power outage confidence is less than 80%, the system can use the stored energy to operate without performing backup operation, that is, the backup time predictor 1022 does not transmit the write strategy instruction to the processor.

In another embodiment, when the memory in the electronic device is, for example, a low standby power consumption static random access memory (SRAM), as the standby power consumption of such memory is relatively low, when the power-off time is, for example, between 50 ms and 0.2 s, backup is not needed, that is, the backup time predictor 1022 does not transmit the write strategy instruction to the processor.

In an embodiment, the processor is a nonvolatile processor (NVP) for calculating and processing the sensed data acquired by the electronic device.

The last performed step is Step S12: performing energy management on operations of the processor based on at least one instruction or/and QoS prediction information, specifically performing energy management on operations of the processor based on at least one of the data bitwidth instruction (Bitwidth), the start instruction (System Start) or the write strategy instruction (Write Configuration), or/and the QoS prediction information (Predicted QoS). Specifically, the step S12 includes the following step: controlling the computation precision of the processor according to the data bitwidth instruction when receiving the data bitwidth instruction; starting the operation of the processor when receiving the start instruction; performing a write operation according to at least one of a write current and write time included in the write strategy instruction when receiving the write strategy instruction.

In an embodiment, the processor includes a start controller 110, an approximate bitwidth controller 111, and a retention time controller 112.

The approximate bitwidth controller 111 is configured to control the computation precision of the processor according to the data bitwidth instruction when receiving the data bitwidth instruction (Bitwidth). In the embodiment, the approximate bitwidth controller 111 has one or more nonvolatile shift units, the nonvolatile shift unit is for example a nonvolatile shifter (NV Shifter), and the approximate bitwidth controller 111 stores the received data bitwidth instruction in the nonvolatile shift unit. In some examples, the computation of the processor includes that the processor calculates and processes the sensed data or interaction data acquired by the electronic device.

In some examples, the process of the sensed data includes that, for example, a wearable device performs processing operation to generate user data that is transmitted by a wireless module or displayed by a display device based on the collected heart rate data, blood pressure data, temperature data, blood oxygen saturation data, diet/nutrition information, medical reminders, health related prompts or information, or other health related data.

In some examples, the process of the interaction data includes that, for example, a user operates a wearable device to respond to an event notification generated by a host device. The wearable device receives an event notification from a host device, and present a reminder and a prompt for response to the user. If the user responds to the prompt, the wearable device transmits the response to the host device. For example, the user responds to a telephone call, text message or other communication received at the host device.

The start controller 110 is configured to start the operation of the processor when receiving a start instruction (System Start). In an embodiment, the start controller 110 has one or more nonvolatile shift units, the nonvolatile shift unit is for example a nonvolatile shifter (NV Shifter), and the start controller 110 stores the received start instruction in the nonvolatile shift unit. In the embodiment, the start controller 110 is, for example, an NVP start trigger controller.

The retention time controller 112 is configured to perform a write operation according to at least one of a write current and write time included in the write strategy instruction when receiving the write strategy instruction (Write Configuration). In the embodiment, the retention time controller 112 has one or more non-volatile shifting units, the non-volatile shift unit is for example a non-volatile shifter (NV Shifter). The retention time controller 112 stores the received write strategy instruction in the nonvolatile shift unit. The retention time controller 112 performs a write data operation according to the received write strategy instruction. In an example, for example, the data written to the memory of the electronic device by the write operation is data calculated or processed by the processor, or a recorded and backed-up computation state, etc.

The processor further receives QoS prediction information (Predicted QoS), so that the processor predicts potential output quality of a program executed in the electronic device based on different approximate methodologies in dynamic bitwidth execution approximation and dynamic backup data retention time, such that the results of the entire energy management system have QoS control.

In the several embodiments provided by the present application, it should be understood that the system, device, and method disclosed can be implemented in other manners. For example, the embodiments of device described above are merely illustrative. For example, the division of the units is only a logical function division, and there are other division manners in implementations. For example, multiple units or components can be combined or integrated into another system, or some features can be ignored or not executed. In addition, the mutual coupling or direct coupling or communication connection as shown or discussed can be achieved by the indirect coupling or communication connection between some interfaces, and devices or units.

Units described as separate components can be or not be physically separate, and components shown as units can be or not be physical units, i.e. the components can be located in one place, and can also be distributed on multiple network units. Some or all of the units can be selected according to actual requirements to achieve the object of the solution of the present embodiments.

In addition, the functional units in the embodiments of the present application can be integrated in one processing unit, and can also be separate physically, or two or more units can be integrated in one unit.

The present application further provides a computer readable storage medium, the storage medium stores a computer program for energy management, and when the program is executed, any of the energy management method described above is performed.

The functions can be stored in a computer readable storage medium if the functions is implemented in the form of a software functional unit and sold or used as a standalone product. Based on such understanding, the technical solutions of the present application essentially or the part contributing to the prior art or the part of the technical solution can be embodied in the form of a software product. The software product is stored in a storage medium and includes several instructions, based on which a computer device (which may be a personal computer, server, or network device, etc.) performs all or part of the steps of the methods described in various embodiments of the present application.

In the embodiments provided by the present application, the computer readable and writable storage medium includes a read only memory (ROM), a random access memory (RAM), an EEPROM, a CD-ROM or other optical disk storage device, disk storage device or other magnetic storage device, flash memory, USB flash drive, mobile hard disk, or any other mediums that can be used to store desired program code with the form of an instruction or data structure and can be accessed by a computer. In addition, any connection is properly known as a computer-readable medium. For example, if the instructions are sent from a website, server, or other remote source by using coaxial cable, fiber optic cable, twisted pair, digital subscriber line (DSL), or wireless technology such as infrared, radio, and microwave, the coaxial cable, fiber optic cable, twisted pair, DSL, or wireless technology such as infrared, radio, and microwave are included in the definition of the medium. However, it should be understood that computer readable and writable storage medium and data storage medium do not include connection, carrier wave, signal, or other transitory medium, but are intended to be directed to non-transitory, tangible storage medium. Disk and optical disk as used in the application include compact disk (CD), laser disk, optical disk, digital versatile disk (DVD), floppy disk, and Blue-ray disk, wherein, the disk typically replicates data magnetically while the optical disk replicates data optically through lasers.

In summary, with the energy management system and method, electronic device, electronic apparatus, and computer readable storage medium provided in the present application, the present application performs prediction computation based on at least one type of the received power supply information, power storage information, and power outage information of the electronic device for at least one moment, and outputs at least one of a data bitwidth instruction, a start instruction or a write strategy instruction, or/and QoS prediction information; and performs energy management on operations of the processor based on the at least one instruction, or/and the QoS prediction information. In the present application, it can be ensured that the operations of the processor is matched with the expected energy thereof through predicting the future power income or power-off time to obtain the data transmission bitwidth or data write strategy and the timing of starting the operations, and the QoS can be matched with the minimum QoS requested in advance through dynamically adjusting the retention time of nonvolatile element according to the write strategy to match the power condition.

While the above embodiments have been shown and described herein, it will be obvious to those skilled in the art that such embodiments are provided by way of example only, and are not intended to limit the application. Numerous variations, changes, and substitutions will now occur to those skilled in the art without departing from the present application. Therefore, all equivalent modifications or changes made by those skilled in the art without departing from the spirit and scope of the application will be covered by the claims.

The invention claimed is:

1. An energy management system, applied in an electronic device with a processor, the energy management system comprises:
   a prediction module, configured to perform a prediction computation based on at least one type of the received power supply information, power storage information and power outage information of the electronic device for at least one moment, and output at least one instruction or/and QoS prediction information, the at least one instruction includes at least one of a data bitwidth instruction, a start instruction or a write strategy instruction; and an execution module, configured to perform energy management on operations of the processor based on the at least one instruction or/and the QoS prediction information output by the prediction module;

wherein, the execution module comprises:

an approximate bitwidth controller, configured to control computation precision of the processor according to the data bitwidth instruction when receiving the data bitwidth instruction output by the prediction module;

a start controller, configured to start the operation of the processor when receiving the start instruction output by the prediction module;

a retention time controller, configured to perform a write operation according to at least one of a write current and write time included in the write strategy instruction when receiving the write strategy instruction output by the prediction module.

2. The energy management system of claim 1, wherein, the prediction module receives at least one type of the power supply information, power storage information and power outage information of the electronic device for at least one moment by a feature extraction module, and the feature extraction module comprises:

a detection unit, configured to acquire the power supply information of the electronic device by collecting a value of current flowing through a detecting element or a value of voltage across the detecting element;

an energy storage unit, configured to acquire the power storage information of the electronic device by collecting a voltage drop of an energy storage element; and/or a power outage sensing unit, configured to acquire the power outage information by collecting a voltage drop across a leak element.

3. The energy management system of claim 1, wherein, the prediction module comprises one or more nonvolatile shift units.

4. The energy management system of claim 1, wherein, the prediction module performs the prediction computation, by one or more neural networks, on at least one type of the received power supply information, power storage information and power outage information of the electronic device for at least one moment, and outputs at least one of the data bitwidth instruction, the start instruction or the write strategy instruction, or/and the QoS prediction information.

5. The energy management system of claim 1, wherein, the prediction module comprises an approximate computation unit, the approximate computation unit is configured to perform approximate computation according to the power supply information and the power storage information to predict and output the data bitwidth instruction and the start instruction.

6. The energy management system of claim 5, wherein, the approximate computation unit comprises:

a future energy predictor, configured to predict future power-on time and a power-on confidence of the electronic device based on the power supply information;

a bitwidth predictor, configured to perform approximate computation for prediction according to the future power-on time, the power-on confidence and the received power storage information of the electronic device and output the data bitwidth instruction and the start threshold.

7. The energy management system of claim 6, wherein, the prediction module further comprises a QoS predictor, the QoS predictor is configured to perform a prediction computation according to the data bitwidth instruction and the power outage information to obtain the QoS prediction information; and output the QoS prediction information to the execution module when the QoS prediction information satisfies a first threshold, and output the start instruction to the execution module when the start threshold satisfies the first threshold; the power outage information comprises a power outage confidence.

8. The energy management system of claim 1, wherein, the prediction module comprises a backup prediction unit, the backup prediction unit comprises:

a power outage predictor, configured to predict future power-off time and a power outage confidence of the electronic device based on the power outage information;

a backup time predictor, configured to generate the write strategy instruction and a write strategy confidence according to the future power-off time and the power outage confidence, and output the write strategy instruction to the execution module when the write strategy confidence satisfies a second threshold, wherein the write strategy instruction comprises at least one of a write current and write time for writing data.

9. The energy management system of claim 1, wherein, the execution module comprises one or more nonvolatile shift units.

10. An electronic device, comprising a processor and an energy management system of claim 1.

11. The electronic device of claim 10, further comprising one or more sensing devices, the one or more sensing devices are configured to sense at least one of geographic location information, ambient light information, environmental magnetic field information, sound information, temperature information, humidity information, pressure sensing information, acceleration information, ultraviolet information, blood sugar information, alcohol concentration information, pulse information, heart rate information, breath information, and exercise amount information.

12. An energy management method, applied in an electronic device with a processor, the energy management method comprises the following steps:

extracting at least one type of information of the electronic device for at least one moment, the at least one type of information includes at least one type of power supply information, power storage information and power outage information;

performing a prediction computation based on the at least one type of information and outputting at least one instruction or/and QoS prediction information, the at least one instruction includes at least one of a data bitwidth instruction, a start instruction or a write strategy instruction; and performing energy management on operations of the processor based on the at least one instruction or/and the QoS prediction information;

wherein, the step of performing energy management on operations of the processor based on the at least one instruction or/and the QoS prediction information comprises:

controlling computation precision of the processor according to the data bitwidth instruction when receiving the data bitwidth instruction;

starting the operation of the processor when receiving the start instruction; or/and performing a write operation according to at least one of a write current and write time included in the write strategy instruction when receiving the write strategy instruction.

13. The energy management method of claim 12, wherein, the step of extracting at least one type of information of the electronic device for at least one moment comprises:
acquiring the power supply information of the electronic device by collecting a value of current flowing through a detecting element or a value of voltage across the detecting element;
acquiring the power storage information of the electronic device by collecting a voltage drop of an energy storage element; and/or
acquiring the power outage information by collecting a voltage drop across a leak element.

14. The energy management method of claim 12, wherein, the step of performing a prediction computation based on the at least one type of information and outputting at least one instruction or/and QoS prediction information comprises performing the prediction computation, by one or more neural networks, on the at least one type of information, and outputting at least one of the data bitwidth instruction, the start instruction or the write strategy instruction, or/and the QoS prediction information.

15. The energy management method of claim 12, wherein, the step of performing a prediction computation based on the at least one type of information and outputting at least one instruction or/and QoS prediction information comprises performing approximate computation for prediction according to the power supply information and the power storage information and outputting the data bitwidth instruction and the start instruction.

16. The energy management method of claim 12, wherein, the step of performing a prediction computation based on the at least one type of information and outputting at least one instruction or/and QoS prediction information comprises:
predicting future power-on time and a power-on confidence based on the power supply information;
performing approximate computation for prediction according to the future power-on time, the power-on confidence and the received power storage information of the electronic device, and outputting the data bitwidth instruction to the processor and outputting the start threshold;
outputting the start instruction to the processor when the start threshold satisfies a first threshold.

17. The energy management method of claim 16, wherein, the step of performing approximate computation for prediction according to the future power-on time, the power-on confidence and the received power storage information of the electronic device, and outputting the data bitwidth instruction to the processor and outputting the start threshold comprises:
performing a prediction computation according to the data bitwidth instruction and the power outage information to obtain the QoS prediction information, wherein the power outage information comprises a power outage confidence;
outputting the QoS prediction information to the processor when the QoS prediction information satisfies the first threshold.

18. The energy management method of claim 12, wherein, the step of performing a prediction computation based on the at least one type of information and outputting at least one instruction or/and QoS prediction information comprises:
predicting future power-off time and a power outage confidence of the electronic device based on the power outage information;
generating a write strategy instruction and a write strategy confidence according to the future power-off time and the power outage confidence, wherein the write strategy instruction comprises at least one of a write current and write time for writing data;
outputting the write strategy instruction when the write strategy confidence satisfies a second threshold.

\* \* \* \* \*